(12) United States Patent
Zhao et al.

(10) Patent No.: US 11,363,636 B2
(45) Date of Patent: Jun. 14, 2022

(54) METHOD AND DEVICE FOR CONTENTION BASED RANDOM ACCESS

(71) Applicant: CHINA ACADEMY OF TELECOMMUNICATIONS TECHNOLOGY, Beijing (CN)

(72) Inventors: Yali Zhao, Beijing (CN); Li Chen, Beijing (CN); Fangli Xu, Beijing (CN)

(73) Assignee: DATANG MOBILE COMMUNICATIONS EQUIPMENT CO., LTD., Beijing (CN)

(*) Notice: Subject to any disclaimer, the term of this patent is extended or adjusted under 35 U.S.C. 154(b) by 201 days.

(21) Appl. No.: 16/475,370

(22) PCT Filed: Feb. 7, 2018

(86) PCT No.: PCT/CN2018/075574
§ 371 (c)(1),
(2) Date: Jul. 1, 2019

(87) PCT Pub. No.: WO2018/127226
PCT Pub. Date: Jul. 12, 2018

(65) Prior Publication Data
US 2020/0404711 A1    Dec. 24, 2020

(30) Foreign Application Priority Data

Jan. 4, 2017  (CN) .......................... 201710004130.6

(51) Int. Cl.
*H04W 76/18* (2018.01)
*H04W 74/08* (2009.01)
(Continued)

(52) U.S. Cl.
CPC ... *H04W 74/0833* (2013.01); *H04W 28/0278* (2013.01); *H04W 52/36* (2013.01);
(Continued)

(58) Field of Classification Search
CPC . H04W 74/0833; H04W 76/18; H04W 76/11; H04W 28/0278; H04W 52/36;
(Continued)

(56) References Cited

U.S. PATENT DOCUMENTS 9,295,084 B2 * 3/2016 Bai ..................... H04W 74/006
10,772,135 B2 * 9/2020 Sahlin ............... H04W 56/0045
(Continued)

FOREIGN PATENT DOCUMENTS

CN         101674661 A    3/2010
CN         101848539 A    9/2010
(Continued)

OTHER PUBLICATIONS

3GPP TSG-RAN WG2 #96 R2-168665, Title: Random Access enhancements (Year: 2016).*
(Continued)

*Primary Examiner* — Lakeram Jangbahadur
(74) *Attorney, Agent, or Firm* — Ladas & Parry, LLP

(57) ABSTRACT

A method and a device for contention-based random access are provided. The method includes: sending, by a terminal side device, an Msg1 corresponding to a two-step contention-based random access to a network side device; receiving, by the terminal side device, an Msg2 returned by the network side device, wherein if the terminal side device determines a failure of the two-step contention-based random access occurs according to a receiving condition of the Msg2 message, the terminal side device performs a handling procedure for the failure of the two-step contention-based random access. The Msg2 message is determined by the network side device according to a receiving condition that the network side device receives the Msg1 message.

15 Claims, 6 Drawing Sheets

(51) Int. Cl.
   *H04W 76/11* (2018.01)
   *H04W 28/02* (2009.01)
   *H04W 52/36* (2009.01)
   *H04W 72/12* (2009.01)
   *H04W 80/02* (2009.01)

(52) U.S. Cl.
   CPC ........ *H04W 72/1263* (2013.01); *H04W 76/11* (2018.02); *H04W 76/18* (2018.02); *H04W 80/02* (2013.01)

(58) Field of Classification Search
   CPC ............. H04W 72/1263; H04W 80/02; H04W 52/362; H04W 52/50
   See application file for complete search history.

(56) References Cited

U.S. PATENT DOCUMENTS

| | | | |
|---|---|---|---|
| 10,873,975 B2* | 12/2020 | Freda | H04W 74/0833 |
| 2013/0039314 A1* | 2/2013 | Prateek | H04W 74/08 370/329 |
| 2018/0103465 A1* | 4/2018 | Agiwal | H04W 72/0413 |
| 2018/0139787 A1* | 5/2018 | Islam | H04W 48/16 |
| 2020/0275496 A1* | 8/2020 | Stern-Berkowitz | H04W 74/0833 |

FOREIGN PATENT DOCUMENTS

| | | |
|---|---|---|
| CN | 102387600 A | 3/2012 |
| CN | 102595636 A | 7/2012 |
| CN | 104159319 A | 11/2014 |

OTHER PUBLICATIONS

International Preliminary Report on Patentability of the International Search Authority for PCT/CN2018/075574 dated Jul. 9, 2019 and its English translation provided by WIPO.
International Search Report for PCT/CN2018/075574 dated Apr. 28, 2018 and its English translation provided by WIPO.
Written Opinion for PCT/CN2018/075574 dated Apr. 28, 2018 and its Englsih translation provided by WIPO.
First office action Chinese patent application 20171004130.6 dated Jan. 2, 2019 and its English translation provided by SIPO.
"On 2-step RACH procedure in NR" 3GPP TSG RAN WG1 Meeting #87 Reno, USA, Nov. 14-18, 2016 R1-1611274 ZTE Corporation, ZTE Microelectronics.
"Random Access enhancements" 3GPP TSG-RAN WG2 #96 Tdoc R2-168665 Reno, Nevada, USA, Nov. 14-18, 2016 Ericsson.

* cited by examiner

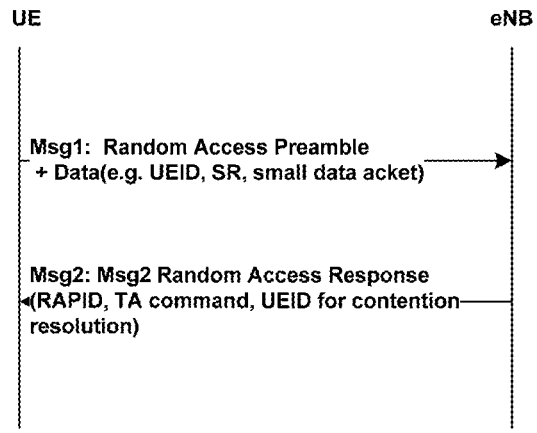

Sending, by a terminal side device, an Msg1 message corresponding to a two-step contention-based random access, to a network side device

402

Receiving, by the terminal side device, an Msg2 message returned by the network side device, wherein if the terminal side device determines a failure of the two-step contention-based random access occurs according to a receiving condition of the Msg2 message, the terminal side device performs a handling procedure for the failure of the two-step contention-based random access; wherein the Msg2 message is determined by the network side device according to a receiving condition that the network side device receives the Msg1 message

FIG. 4

METHOD AND DEVICE FOR CONTENTION BASED RANDOM ACCESS

CROSS-REFERENCE TO RELATED APPLICATIONS

The present application is the U.S. national phase of PCT/CN2018/075574 filed on Feb. 7, 2018 which claims priority to Chinese Patent Application No. 201710004130.6 filed in China on Jan. 4, 2017, the disclosure of which are incorporated by reference herein in their entireties.

FIELD OF THE INVENTION

Embodiments of the present disclosure relate to the technical field of communications, and in particular to a method and a device for contention-based random access.

BACKGROUND OF THE INVENTION

Random access of an LTE system is divided into two types: contention-based random access and non-contention based random access. The contention-based random access is used for five purposes: 1) initial access of a terminal side device; Radio Resource Control (RRC) connection reestablishment; handover; downlink data arrival in a RRC connected state in a non-synchronized status; uplink data arrival in a RRC connected state; and positioning in a RRC connected state. The non-contention based random access is used for handover, downlink data arrival, positioning, and acquisition of uplink timing.

5G systems also support the aforementioned two types of random access, namely, the contention-based random access and non-contention based random access. Correspondingly, there is an urgent need for a solution suitable for a 5G system to determine a handling procedure for a failure of contention-based random access.

SUMMARY OF THE INVENTION

In view of the above technical problem, embodiments of the present disclosure provide a method and a device for contention-based random access, which at least partially solve the technical problem of lack of a solution suitable for a 5G system to determine a handling procedure for a failure of contention-based random access.

According to a first aspect of an embodiment of the present disclosure, a method for contention-based random access is provided, including:

sending, by a terminal side device, an Msg1 message corresponding to a two-step contention-based random access to a network side device;

receiving, by the terminal side device, an Msg2 message returned by the network side device, wherein if the terminal side device determines a failure of the two-step contention-based random access occurs according to a receiving condition of the Msg2 message, the terminal side device performs a handling procedure for the failure of the two-step contention-based random access;

wherein the Msg2 message is determined by the network side device according to a receiving condition that the network side device receives the Msg1 message.

Optionally, the Msg1 message at least carries a Random Access Preamble, and a data part.

Optionally, if only the Random Access Preamble in the Msg1 message is successfully received by the network side device and the data part is not successfully received by the network side device, then the terminal side device receives, within a receiving window of the Msg2 message or before a timer corresponding to the Msg2 message times out, a Msg2 message corresponding to a four-step contention-based random access returned by the network side device, and the terminal side device switches to the four-step contention-based random access.

Optionally, if neither the Random Access Preamble nor the data part in the Msg1 message corresponding to the two-step contention-based random access is successfully received, then the terminal side device is incapable of receiving the Msg2 message within a receiving window of the Msg2 message or before a timer corresponding to the Msg2 message times out, and the terminal side device continues to attempt the two-step contention-based random access until one of following (1)-(3):

(1) the two-step contention-based random access succeeds; or (2) if a maximum number of total transmissions of the Random Access Preamble configured by the network side device for the terminal side device is reached, then the contention-based random access is determined to be failed; or (3) in a process of attempting the two-step contention-based random access, if only the Random Access Preamble in the Msg1 message corresponding to the two-step contention-based random access is successfully received by the network side device and the data part is not successfully received by the network side device, the terminal side device receives, within the receiving window of the Msg2 message or before the timer corresponding to the Msg2 message times out, the Msg2 message corresponding to a four-step contention-based random access returned by the network side device, and the terminal side device switches to the four-step contention-based random access.

Optionally, if neither the Random Access Preamble nor the data part in the Msg1 message corresponding to the two-step contention-based random access is successfully received, the terminal device message is incapable of receiving the Msg2 message within a receiving window of the Msg2 message or before a timer corresponding to the Msg2 message times out, and the terminal side device directly switches to a four-step contention-based random access to make an attempt until one of following (1)-(2):

(1) the four-step contention-based random access succeeds; or (2) if a maximum number of total transmissions of the Random Access Preamble configured by the network side device for the terminal side device is reached, then the contention-based random access is determined to fail.

Optionally, if neither the Random Access Preamble nor the data part of the Msg1 message corresponding to the two-step contention-based random access is successfully received, the terminal side device is incapable of receiving the Msg2 message within a receiving window of the Msg2 message or before a timer corresponding to the Msg2 message times out, and the terminal side device continues to attempt the two-step contention-based random access until one of following (1)-(3):

(1) the two-step contention-based random access succeeds; or (2) if a maximum number of total transmissions of the Random Access Preamble of the two-step contention-based random access configured by the network side device for the terminal side device is reached, a four-step contention-based random access is performed until the four-step contention-based random access succeeds, or if a maximum number of total transmissions of the Random Access Preamble of the four-step contention-based random access configured by the network side device for the terminal side device is reached, the contention-based random access is determined to fail; or (3) in a process of attempting the two-step contention-based random access, if only the Random Access Preamble in the Msg1 message corresponding to the two-step contention-based random access is successfully received by the network side device and the data part is not successfully received by the network side device, the terminal side device receives, within the receiving window of the Msg2 message or before the timer corresponding to the Msg2 message times out, a Msg2 message corresponding to the four-step contention-based random access returned by the network side device, and the terminal side device switches to the four-step contention-based random access.

Optionally, the data part includes at least one of a terminal identifier, a scheduling request (SR), a buffer status report (BSR), and real service data.

Optionally, the Random Access Preamble and the data part are frequency division multiplexed (FDM), or time division multiplexed (TDM).

Optionally, in case of each failure of the contention-based random access, the terminal side device backs off for a random period of time according to backoff parameters configured by the network side device and then attempts the two-step contention-based random access or a four-step contention-based random access again.

Optionally, identical backoff parameters are configured by the network side device for the two-step contention-based random access and the four-step contention-based random access, or different backoff parameters are configured by the network side device for the two-step contention-based random access and the four-step contention-based random access.

Optionally, identical power ramping step parameters are configured by the network side device for the two-step contention-based random access and a four-step contention-based random access or different power ramping step parameters are configured by the network side device for the two-step contention-based random access and the four-step contention-based random access; or for the two-step contention-based random access, a power ramping step of the Random Access Preamble and a power ramping step of the data part of the Msg1 message corresponding to the two-step contention-based random access are different.

Optionally, wherein if a number of total transmissions of the Random Access Preamble of the two-step contention-based random access and/or the four-step contention-based random access of the terminal side device reaches a maximum number of total transmissions of the Random Access Preamble configured by the network side device for the terminal side device, a problem of the contention-based random access is reported to a higher layer, and the higher layer determines that a radio link of the terminal side device fails.

Optionally, the method further includes:
receiving, by the terminal side device, configuration information of parameters about the two-step contention-based random access from the network side device.

Optionally, the parameters about the two-step contention-based random access include at least one of:
a maximum number of transmissions of the Random Access Preamble, backoff parameters for re-attempt in case of failure of the random access, the power ramping step parameters in a process of the random access, and behaviors of the terminal side device after failure of receiving an entirety or a part of the Msg1 message.

Optionally, the maximum number of transmissions of the Random Access Preamble includes at least one of:
a maximum number of total transmissions of the Random Access Preamble of the two-step contention-based random access, a maximum number of total transmissions of the Random Access Preamble of the four-step contention-based random access, and a maximum number of total transmissions of the Random Access Preamble.

Optionally, the behaviors of the terminal side device after the failure of receiving the entirety or a part of the Msg1 message includes: continuing to attempt the two-step contention-based random access by the terminal side device, or continuing to attempt the four-step contention-based random access by the terminal side device, or attempting the two-step contention-based random access for N times by the terminal side device and, if the attempting the two-step contention-based random access for N times failed, proceeding to attempt the four-step contention-based random access by the terminal side device, wherein N is the maximum number of total transmissions of the Random Access Preamble of the two-step contention-based random access.

According to a second aspect of the embodiments of the present disclosure, a method for contention-based random access is further provided, including:
receiving, by a network side device, an Msg1 message corresponding to two-step contention-based random access sent by a terminal side device;
determining an Msg2 message according to a receiving condition of the Msg1 message by the network side device, and returning the Msg2 message to the terminal side device, wherein if the terminal side device determines a failure of the two-step contention-based random occurs according to the receiving condition of the Msg2 message, the terminal side device performs a handling procedure for the failure of the two-step contention-based random access.

Optionally, if both a Random Access Preamble and a data part of the Msg1 message corresponding to the two-step contention-based random access are successfully received, the network side device returns the Msg2 message corresponding to the two-step contention-based random access to the terminal side device; or if only the Random Access Preamble in the Msg1 message corresponding to the two-step contention-based random access is successfully received and the data part is not successfully received, the network side device returns, within a receiving window of the Msg2 message or before a timer corresponding to the Msg2 message times out, a Msg2 message corresponding to a four-step contention-based random access to the terminal side device; or if neither the Random Access Preamble nor the data part of the Msg1 message corresponding to the two-step contention-based random access is successfully received, the network side device does not return the Msg2 message to the terminal side device.

Optionally, if a Random Access Preamble in the Msg1 message corresponding to the two-step contention-based random access is not successfully received and only the data part is successfully received, the network side device returns the Msg2 corresponding to the two-step contention-based random access to the terminal side device.

Optionally, RAPID in the Msg2 message uses a predetermined value, or uses a predetermined domain identifier in a RAR MAC PDU sub-header or a MAC PDU.

Optionally, the method further includes:

sending, by the network side device, configuration information of parameters about the two-step contention-based random access to the terminal side device.

Optionally, the parameters about the two-step contention-based random access include at least one of:

a maximum number of transmissions of a Random Access Preamble, backoff parameters for re-attempt in case of failure of the random access, power ramping step parameters in a process of the random access, and behaviors of the terminal side device after failure of receiving an entirety or a part of the Msg1 message.

Optionally, the maximum number of transmissions of the Random Access Preamble includes at least one of:

a maximum number of total transmissions of the Random Access Preamble of the two-step contention-based random access, a maximum number of total transmissions of the Random Access Preamble of a four-step contention-based random access, and a maximum number of total transmissions of the Random Access Preamble.

Optionally, identical backoff parameters are configured by the network side device for the two-step contention-based random access and a four-step contention-based random access, or different backoff parameters are configured by the network side device for the two-step contention-based random access and the four-step contention-based random access.

Optionally, identical power ramping step parameters are configured by the network side device for the two-step contention-based random access and a four-step contention-based random access or different power ramping step parameters are configured by the network side device for the two-step contention-based random access and the four-step contention-based random access; or for the two-step contention-based random access, a power ramping step of the Random Access Preamble and a power ramping step of the data part of the Msg1 message corresponding to the two-step contention-based random access are different.

According to a third aspect of the embodiments of the present disclosure, there is also provided a device for contention-based random access, which is applied to a terminal side device, and includes:

a first sending module configured to send, to a network side device, an Msg1 message corresponding to a two-step contention-based random access; and a first processing module configured to receive an Msg2 message returned by the network side device, wherein if the terminal side device determines a failure of the two-step contention-based random access occurs according to a receiving condition of the Msg2 message, the terminal side device performs a handling procedure for the failure of the two-step contention-based random access, and the Msg2 message is determined by the network side device according to a receiving condition that the network side device receives the Msg1 message.

Optionally, the Msg1 message at least carries a Random Access Preamble, and a data part.

Optionally, the first processing module is further configured to:

if only the Random Access Preamble in the Msg1 message is successfully received by the network side device and the data part is not successfully received by the network side device, receive, within a receiving window of the Msg2 message or before a timer corresponding to the Msg2 message times out, a Msg2 message corresponding to a four-step contention-based random access returned by the network side device, and the terminal side device switches to the four-step contention-based random access.

Optionally, the first processing module is further configured to:

if neither the Random Access Preamble nor the data part in the Msg1 message corresponding to the two-step contention-based random access is successfully received, be incapable of receiving the Msg2 message within a receiving window of the Msg2 message or before a timer corresponding to the Msg2 message times out, and continue to attempt the two-step contention-based random access until one of following (1)-(3):

(1) the two-step contention-based random access succeeds; or (2) if a maximum number of total transmissions of the Random Access Preamble configured by the network side device for the terminal side device is reached, then the contention-based random access is determined to be failed; or (3) in a process of attempting the two-step contention-based random access, if only the Random Access Preamble in the Msg1 message corresponding to the two-step contention-based random access is successfully received by the network side device and the data part is not successfully received by the network side device, the terminal side device receives, within the receiving window of the Msg2 message or before the timer corresponding to the Msg2 message times out, the Msg2 message corresponding to a four-step contention-based random access returned by the network side device, and the terminal side device switches to the four-step contention-based random access.

Optionally, the first processing module is further configured to:

if neither the Random Access Preamble nor the data part in the Msg1 message corresponding to the two-step contention-based random access is successfully received, be incapable of receiving the Msg2 message within a receiving window of the Msg2 message or before a timer corresponding to the Msg2 message times out, and directly switch to a four-step contention-based random access to make an attempt until one of following (1)-(2):

(1) the four-step contention-based random access succeeds; or (2) if a maximum number of total transmissions of the Random Access Preamble configured by the network side device for the terminal side device is reached, then the contention-based random access is determined to fail.

Optionally, the first processing module is further configured to:

if neither the Random Access Preamble nor the data part of the Msg1 message corresponding to the two-step contention-based random access is successfully received, be incapable of receiving the Msg2 message within a receiving window of the Msg2 message or before a timer corresponding to the Msg2 message times out, and continue to attempt the two-step contention-based random access until one of following (1)-(3):

(1) the two-step contention-based random access succeeds; or (2) if a maximum number of total transmissions of the Random Access Preamble of the two-step contention-based random access configured by the network side device for the terminal side device is reached, a four-step contention-based random access is performed until the four-step contention-based random access succeeds, or if a maximum number of total transmissions of the Random Access Preamble of the four-step contention-based random access configured by the network side device for the terminal side device is reached, the contention-based random access is determined to fail; or (3) in a process of attempting the two-step contention-based random access, if only the Random Access Preamble in the Msg1 message corresponding to the two-step contention-based random access is successfully received by the network side device and the data part is not successfully received by the network side device, the terminal side device receives, within the receiving window of the Msg2 message or before the timer corresponding to the Msg2 message times out, a Msg2 message corresponding to the four-step contention-based random access returned by the network side device, and the terminal side device switches to the four-step contention-based random access.

Optionally, the data part includes at least one of a terminal identifier, a scheduling request (SR), a buffer status report (BSR), and real service data.

Optionally, the Random Access Preamble and the data part are frequency division multiplexed (FDM), or time division multiplexed (TDM).

Optionally, the first processing module is further configured to:

in case of each failure of the contention-based random access, back off for a random period of time according to backoff parameters configured by the network side device and then attempt the two-step contention-based random access or a four-step contention-based random access again.

Optionally, identical backoff parameters are configured by the network side device for the two-step contention-based random access and the four-step contention-based random access, or different backoff parameters are configured by the network side device for the two-step contention-based random access and the four-step contention-based random access.

Optionally, identical power ramping step parameters are configured by the network side device for the two-step contention-based random access and a four-step contention-based random access or different power ramping step parameters are configured by the network side device for the two-step contention-based random access and the four-step contention-based random access; or for the two-step contention-based random access, a power ramping step of the Random Access Preamble and a power ramping step of the data part of the Msg1 message corresponding to the two-step contention-based random access are different.

Optionally, the first processing module is further configured to:

if a number of total transmissions of the Random Access Preamble of the two-step contention-based random access and/or the four-step contention-based random access of the terminal side device reaches a maximum number of total transmissions of the Random Access Preamble configured by the network side device for the terminal side device, a problem of the contention-based random access is reported to a higher layer, and the higher layer determines that a radio link of the terminal side device fails.

Optionally, the device further includes:

a first receiving module configured to configuration information of parameters about the two-step contention-based random access from the network side device.

Optionally, the parameters about the two-step contention-based random access include at least one of:

a maximum number of transmissions of the Random Access Preamble, backoff parameters for re-attempt in case of failure of the random access, the power ramping step parameters in a process of the random access, and behaviors of the terminal side device after failure of receiving an entirety or a part of the Msg1 message.

Optionally, the maximum number of transmissions of the Random Access Preamble includes at least one of:

a maximum number of total transmissions of the Random Access Preamble of the two-step contention-based random access, a maximum number of total transmissions of the Random Access Preamble of the four-step contention-based random access, and a maximum number of total transmissions of the Random Access Preamble.

Optionally, the behaviors of the terminal side device after the failure of receiving the entirety or a part of the Msg1 message includes: continuing to attempt the two-step contention-based random access by the terminal side device, or continuing to attempt the four-step contention-based random access by the terminal side device, or attempting the two-step contention-based random access for N times by the terminal side device and, if the attempting the two-step contention-based random access for N times failed, proceeding to attempt the four-step contention-based random access by the terminal side device, wherein N is the maximum number of total transmissions of the Random Access Preamble of the two-step contention-based random access.

According to a fourth aspect of the embodiments of the present disclosure, there is also provided a device for contention-based random access, which is applied to a network side device, and includes:

a second receiving module configured to receive an Msg1 message corresponding to a two-step contention-based random access sent by a terminal side device; and a second sending module configured to determine an Msg2 message according to a receiving condition of the Msg1 message, and return the Msg2 message to the terminal side device, wherein if the terminal side device determines a failure of the two-step contention-based random occurs according to the receiving condition of the Msg2 message, the terminal side device performs a handling procedure for the failure of the two-step contention-based random access.

Optionally, the second sending module is further configured to:

if both a Random Access Preamble and a data part of the Msg1 message corresponding to the two-step contention-based random access are successfully received, return the Msg2 message corresponding to the two-step contention-based random access to the terminal side device; or if only the Random Access Preamble in the Msg1 message corresponding to the two-step contention-based random access is successfully received and the data part is not successfully received, return, within a receiving window of the Msg2 message or before a timer corresponding to the Msg2 message times out, a Msg2 message corresponding to a four-step contention-based random access to the terminal side device; or if neither the Random Access Preamble nor the data part of the Msg1 message corresponding to the two-step contention-based random access is successfully received, not return the Msg2 message to the terminal side device.

Optionally, the second sending module is further configured to:

if a Random Access Preamble in the Msg1 message corresponding to the two-step contention-based random access is not successfully received and only the data part is successfully received, return the Msg2 corresponding to the two-step contention-based random access to the terminal side device.

Optionally, RAPID in the Msg2 message uses a predetermined value, or uses a predetermined domain identifier in a RAR MAC PDU sub-header or a MAC PDU.

Optionally, the device further includes:

a third sending module configured to send configuration information of parameters about the two-step contention-based random access to the terminal side device.

Optionally, the parameters about the two-step contention-based random access include at least one of:

a maximum number of transmissions of a Random Access Preamble, backoff parameters for re-attempt in case of failure of the random access, power ramping step parameters in a process of the random access, and behaviors of the terminal side device after failure of receiving an entirety or a part of the Msg1 message.

Optionally, the maximum number of transmissions of the Random Access Preamble includes at least one of:

a maximum number of total transmissions of the Random Access Preamble of the two-step contention-based random access, a maximum number of total transmissions of the Random Access Preamble of a four-step contention-based random access, and a maximum number of total transmissions of the Random Access Preamble.

Optionally, identical backoff parameters are configured by the network side device for the two-step contention-based random access and a four-step contention-based random access, or different backoff parameters are configured by the network side device for the two-step contention-based random access and the four-step contention-based random access.

Optionally, identical power ramping step parameters are configured by the network side device for the two-step contention-based random access and a four-step contention-based random access or different power ramping step parameters are configured by the network side device for the two-step contention-based random access and the four-step contention-based random access; or for the two-step contention-based random access, a power ramping step of the Random Access Preamble and a power ramping step of the data part of the Msg1 message corresponding to the two-step contention-based random access are different.

According to a fifth aspect of the embodiments of the present disclosure, there is also provided a terminal side device, including: a processor, a storage, and a computer program stored on the storage and executable by the processor, wherein when the processor executes the computer program, the processor implements steps of the method for contention-based random access according to the first aspect.

According to a sixth aspect of the embodiments of the present disclosure, there is also provided a network side device, including: a processor, a storage, and a computer program stored on the storage and executable by the processor, wherein when the processor executes the computer program, the processor implements steps of the method for contention-based random access according to the second aspect.

According to a seventh aspect of the embodiments of the present disclosure, there is also provided a computer program stored on the computer readable storage medium, wherein when the computer program is executed by a processor, the processor implements steps of the method for contention-based random access according to the first aspect.

According to an eighth aspect of embodiments of the present disclosure, there is also provided a computer program stored on the computer readable storage medium, wherein, when the computer program is executed by a processor, the processor implements steps of the method for contention-based random access according to the second aspect.

One of the above technical solutions has the following advantages or advantages effects: the network side device determines how to return the Msg2 message according to the receiving condition of the Msg1 message, and if the terminal side device determines a failure of the two-step contention-based random access occurs according to a returning condition that the network side device returns the Msg2 message, it proceeds to handle the two-step contention-based random access. As such, a technical solution for determining a handling procedure for the failure of the two-step contention-based random access is provided, so that the random access procedure of the 5G system can be further perfected.

BRIEF DESCRIPTION OF THE DRAWINGS

In order to illustrate the embodiments of the present disclosure or the technical solutions in the prior art more clearly, the drawings used in the description of the embodiments will be briefly set forth below. It is obvious that the drawings in the following description only relate to some embodiments of the present disclosure. Other drawings can be obtained by those skilled in the art based on the accompanying drawings without any creative effort.

FIG. 3 is a schematic diagram of a two-step contention-based random access procedure introduced in a 5G system according to the related art;

FIG. 4 is a flowchart of a method for contention-based random access in Embodiment 1 of the present disclosure;

DETAILED DESCRIPTION OF THE EMBODIMENT(S) OF THE INVENTION

Figure 1:
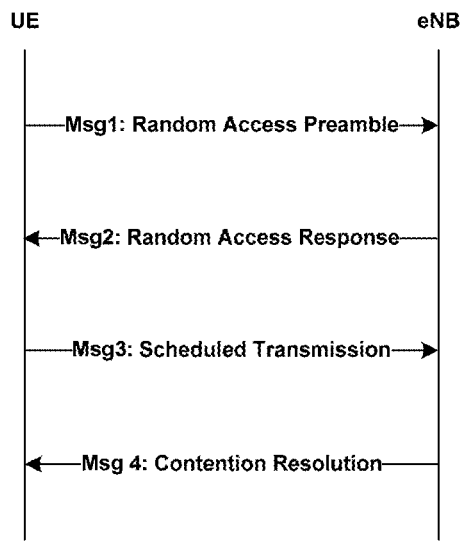
FIG. 1 is a schematic diagram of an LTE four-step contention-based random access procedure according to the related art.

Exemplary embodiments of the present disclosure will be described in more detail below with reference to the accompanying drawings. While exemplary embodiments of the present disclosure are illustrated in the drawings, it should be understood that the present disclosure can be implemented in various ways and should not be limited by the embodiments set forth herein. Rather, these embodiments are provided so that the present disclosure can be more thoroughly understood and that the scope of the present disclosure can be fully conveyed to those skilled in the art.

First, a random access procedure of an LTE system and a two-step random access procedure newly introduced in a 5G system are briefly described respectively.

Random Access of LTE System

Random access of an LTE system is divided into two types: contention-based random access and non-contention based random access, with the respective procedures as follows:

The contention-based random access is used for five purposes: 1) initial access of the terminal side device; Radio Resource Control (RRC) connection reestablishment; handover; downlink data arrival in a RRC connected state in a non-synchronized status; uplink data arrival in the RRC connected state; and positioning in the RRC connected state. Procedures thereof are shown in FIG. 1, primarily including four steps:

Msg1: a User Equipment (UE) selects a random access preamble and a Physical Random Access Channel (PRACH) resource, and uses the PRACH resource to send the selected random access preamble to a base station.

Msg2: The base station receives the preamble, calculates a timing advance (Time Alignment (TA)), and sends a random access response to the UE. The random access response includes information about the timing advance and a UL grant for Msg3, and a Cell Radio Network Temporary Identifier (C-RNTI) distributed by a network side device. PDCCH carrying an Msg2 scheduling message is scrambled by a Random Access Radio Network Temporary Identifier (RA-RNTI), and the RA-RNTI uniquely corresponds to a time-frequency resource sending the Msg1, in a 10 ms window. In addition, the Msg2 also carries a preamble ID, and the UE determines, according to the RA-RNTI and the preamble ID, that the Msg2 corresponds to the Msg1 sent thereby.

Msg3: The UE sends an uplink transmission on a UL grant designated by the Msg2. The contents of the Msg3 uplink transmission are different for different random access sources. For example, for an initial access, the Msg3 transmits a RRC connection establishment request.

Msg4: A contention resolution message. The UE can determine whether the random access is successful according to the Msg4. For an initial access of the UE, after the contention resolution succeeds, the temporary C-RNTI is automatically converted into a unique UE identifier (C-RNTI) of the UE in the cell.

Figure 2:
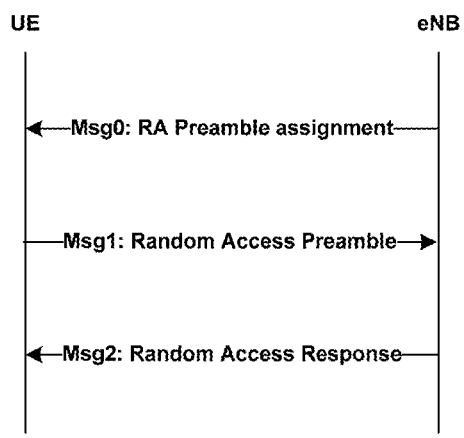
FIG. 2 is a schematic diagram of a three-step non-contention based random access procedure of an LTE system according to the related art.

The non-contention based random access is used for handover, downlink data arrival, positioning, and acquisition of uplink timing. Procedures thereof are shown in FIG. 2, primarily including three steps:

Msg0: A base station allocates a dedicated preamble for non-contention based random access and a PRACH resource used for a random access, to a UE.

Msg1: The UE sends a designated dedicated preamble to the base station on a designated PRACH resource according to an instruction from Msg0. After receiving the Msg1, the base station calculates an uplink timing advance TA according to the Msg1.

Msg2: The base station sends a random access response to the UE. The random access response includes information about the time advance and a resource allocated UL grant for subsequent uplink transmission, and the timing advance is used for the timing relationship of the subsequent uplink transmission of the UE.

(2) Two-Step Random Access Procedure Newly Introduced in 5G System

For contention-based random access, in order to shorten random access delay, the 5G system supports two-step random access in addition to the four-step random access of current LTE systems. A flowchart of the two-step random access is shown in FIG. 3.

The 5G system supports two types of contention-based random access: two-step contention-based random access and four-step contention-based random access.

Embodiment 1

Referring to FIG. 4, a flowchart of a method for contention-based random access is shown, specifically with the steps as follows:

Step 401: sending, by a terminal side device, an Msg1 message corresponding to a two-step contention-based random access, to a network side device; and Step 402: receiving, by the terminal side device, an Msg2 message returned by the network side device, wherein if the terminal side device determines a failure of the two-step contention-based random access occurs according to a receiving condition of the Msg2 message, the terminal side device performs a handling procedure for the failure of the two-step contention-based random access;

wherein the Msg2 message is determined by the network side device according to a receiving condition that the network side device receives the Msg1 message.

The above receiving condition of the Msg2 message can be divided into a condition where an Msg2 message is received and a condition where no Msg2 message is received. Receiving the Msg2 message may refer to: receiving an Msg2 message corresponding to the four-step contention-based random access. In addition, not receiving the Msg2 message may refer to: the terminal side device does not receive an Msg2 message within a receiving window of the Msg2 message or before a timer corresponding to the Msg2 message times out.

Optionally, in this embodiment, the Msg1 message at least carries a Random Access Preamble, and a data part. Optionally, the data part includes at least one of a terminal identifier, a scheduling request (SR), a buffer status report (BSR), and real service data.

Further, the Random Access Preamble and the data part are frequency division multiplexed (FDM), or time division multiplexed (TDM).

The above receiving condition of the Msg1 message can be divided into: i) both the Random Access Preamble and the data part in the Msg1 message are successfully received; ii) the Random Access Preamble in the Msg1 message is not successfully received, but the data part is successfully received; and iii) neither the Random Access Preamble nor the data part in the Msg1 message is successfully received.

In this embodiment, the terminal side device determines whether the two-step contention-based random access fails according to a returning condition that the network side device returns the Msg2 message. The Msg2 message is determined by the network side device according to a receiving condition of the Msg1 message. If a failure of the two-step contention-based random access is determined, the process proceeds to handle the two-step contention-based random access. As such, a technical solution for determining a handling procedure of a failure of the two-step random access is provided, so that the random access procedure of the 5G system can be further perfected.

After determining that a failure of the two-step random access occurs, the terminal side device may further determine a subsequent handling procedure of the failure of the two-step random access according to the receiving condition of the Msg2 message, so that the random access procedure of the 5G system could be further perfected. That is, handling the failure of the two-step contention-based random access in the step 402 may refer to:

In the step 402, if only the Random Access Preamble in the Msg1 message is successfully received by the network side device and the data part is not successfully received by the network side device, then the terminal side device receives, within a receiving window of the Msg2 message or before a timer corresponding to the Msg2 message times out, a Msg2 message corresponding to a four-step contention-based random access returned by the network side device, and the terminal side device switches to the four-step contention-based random access.

In the step 402, if neither the Random Access Preamble nor the data part in the Msg1 message corresponding to the two-step contention-based random access is successfully received, then the terminal side device is incapable of receiving the Msg2 message within a receiving window of the Msg2 message or before a timer corresponding to the Msg2 message times out, and the terminal side device continues to attempt the two-step contention-based random access until one of following (1)-(3):

(1) the two-step contention-based random access succeeds; or (2) if a maximum number of total transmissions of the Random Access Preamble configured by the network side device for the terminal side device is reached, then the contention-based random access is determined to be failed; or (3) in the step 402, in a process of attempting the two-step contention-based random access, if only the Random Access Preamble in the Msg1 message corresponding to the two-step contention-based random access is successfully received by the network side device and the data part is not successfully received by the network side device, the terminal side device receives, within the receiving window of the Msg2 message or before the timer corresponding to the Msg2 message times out, the Msg2 message corresponding to a four-step contention-based random access returned by the network side device, and the terminal side device switches to the four-step contention-based random access.

In the step 402, the performing a handling procedure for the failure of the two-step contention-based random access refers to: if neither the Random Access Preamble nor the data part in the Msg1 message corresponding to the two-step contention-based random access is successfully received, the terminal device message is incapable of receiving the Msg2 message within a receiving window of the Msg2 message or before a timer corresponding to the Msg2 message times out, and the terminal side device directly switches to a four-step contention-based random access to make an attempt until one of following (1)-(2):

(1) the four-step contention-based random access succeeds; or (2) if a maximum number of total transmissions of the Random Access Preamble configured by the network side device for the terminal side device is reached, then the contention-based random access is determined to fail.

In the step 402, the performing a handling procedure for the failure of the two-step contention-based random access refers to: if neither the Random Access Preamble nor the data part of the Msg1 message corresponding to the two-step contention-based random access is successfully received, the terminal side device is incapable of receiving the Msg2 message within a receiving window of the Msg2 message or before a timer corresponding to the Msg2 message times out, and the terminal side device continues to attempt the two-step contention-based random access until one of following (1)-(3):

(1) the two-step contention-based random access succeeds; or (2) if a maximum number of total transmissions of the Random Access Preamble of the two-step contention-based random access configured by the network side device for the terminal side device is reached, a four-step contention-based random access is performed until the four-step contention-based random access succeeds, or if a maximum number of total transmissions of the Random Access Preamble of the four-step contention-based random access configured by the network side device for the terminal side device is reached, the contention-based random access is determined to fail; or (3) in a process of attempting the two-step contention-based random access, if only the Random Access Preamble in the Msg1 message corresponding to the two-step contention-based random access is successfully received by the network side device and the data part is not successfully received by the network side device, the terminal side device receives, within the receiving window of the Msg2 message or before the timer corresponding to the Msg2 message times out, a Msg2 message corresponding to the four-step contention-based random access returned by the network side device, and the terminal side device switches to the four-step contention-based random access.

In this embodiment, in case of each failure of the contention-based random access, the terminal side device backs off for a random period of time according to backoff parameters configured by the network side device and then attempts the two-step contention-based random access or a four-step contention-based random access again.

In this embodiment, identical backoff parameters are configured by the network side device for the two-step contention-based random access and the four-step contention-based random access, or different backoff parameters are configured by the network side device for the two-step contention-based random access and the four-step contention-based random access.

In this embodiment, identical power ramping step parameters are configured by the network side device for the two-step contention-based random access and a four-step contention-based random access or different power ramping step parameters are configured by the network side device for the two-step contention-based random access and the four-step contention-based random access; or for the two-step contention-based random access, a power ramping step of the Random Access Preamble and a power ramping step of the data part of the Msg1 message corresponding to the two-step contention-based random access are different.

In this embodiment, if a number of total transmissions of the Random Access Preamble of the two-step contention-based random access and/or the four-step contention-based random access of the terminal side device reaches a maximum number of total transmissions of the Random Access Preamble configured by the network side device for the terminal side device, a problem of the contention-based random access is reported to a higher layer, and the higher layer determines that a radio link of the terminal side device fails.

In this embodiment, the method further includes: receiving, by the terminal side device, configuration information of parameters about the two-step contention-based random access from the network side device.

In this embodiment, the parameters about the two-step contention-based random access include at least one of:

a maximum number of transmissions of the Random Access Preamble, backoff parameters for re-attempt in case of failure of the random access, the power ramping step parameters in a process of the random access, and behaviors of the terminal side device after failure of receiving an entirety or a part of the Msg1 message.

In this embodiment, the maximum number of transmissions of the Random Access Preamble includes at least one of:

a maximum number of total transmissions of the Random Access Preamble of the two-step contention-based random access, a maximum number of total transmissions of the Random Access Preamble of the four-step contention-based random access, and a maximum number of total transmissions of the Random Access Preamble.

In this embodiment, the behaviors of the terminal side device after the failure of receiving the entirety or a part of the Msg1 message includes: continuing to attempt the two-step contention-based random access by the terminal side device, or continuing to attempt the four-step contention-based random access by the terminal side device, or attempting the two-step contention-based random access for N times by the terminal side device and, if the attempting the two-step contention-based random access for N times failed, proceeding to attempt the four-step contention-based random access by the terminal side device, wherein N is the maximum number of total transmissions of the Random Access Preamble of the two-step contention-based random access.

In this embodiment, the terminal side device determines whether the two-step contention-based random access fails according to a returning condition that the network side device returns the Msg2 message. The Msg2 message is determined by the network side device according to a receiving condition of the Msg1 message. If a failure of the two-step contention-based random access is determined, a handling procedure for the failure of the two-step contention-based random access is performed. As such, a technical solution for determining a handling procedure for the failure of the two-step contention-based random access is provided, so that the random access procedure of the 5G system can be further perfected.

Further, the terminal side device can determine the subsequent handling procedure of the failure of the two-step random access according to the returning condition that the network side device returns the Msg2 message, so that the random access procedure of the 5G system could be further perfected.

Embodiment 2

Figure 5:
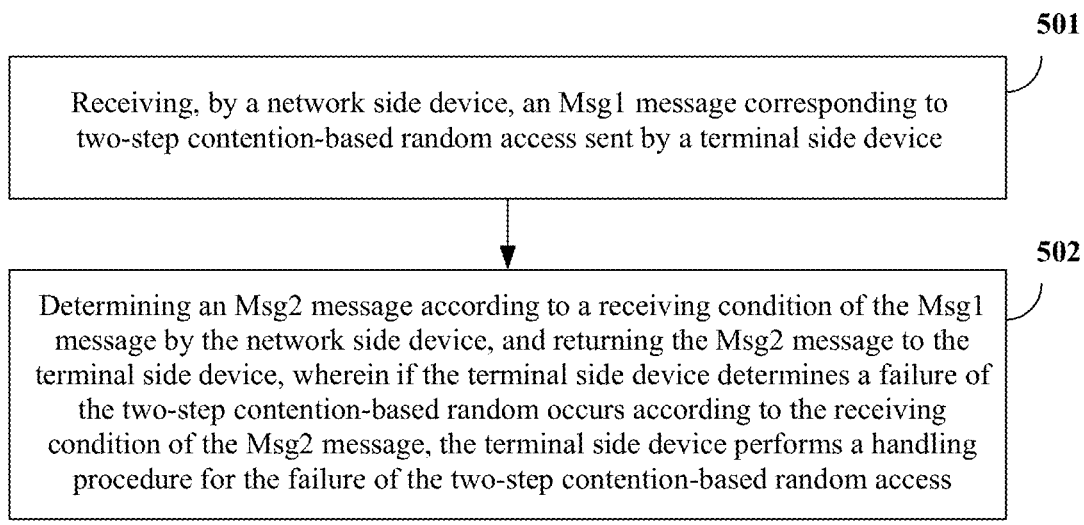
FIG. 5 is a flowchart of a method for contention-based random access in Embodiment 2 of the present disclosure.

Referring to FIG. 5, a flowchart of a method for contention-based random access is shown, specifically with the steps as follows:

Step 501: receiving, by a network side device, an Msg1 message corresponding to two-step contention-based random access sent by a terminal side device.

Optionally, in the embodiment, the Msg1 message at least carries a Random Access Preamble, and a data part. Optionally, the data part includes at least one of a terminal identifier, a scheduling request (SR), a buffer status report (BSR), and real service data.

Further, the Random Access Preamble and the data part are frequency division multiplexed (FDM), or time division multiplexed (TDM).

Step 502: determining an Msg2 message according to a receiving condition of the Msg1 message by the network side device, and returning the Msg2 message to the terminal side device, wherein if the terminal side device determines a failure of the two-step contention-based random occurs according to the receiving condition of the Msg2 message, the terminal side device performs a handling procedure for the failure of the two-step contention-based random access.

The above receiving condition of the Msg1 message can be divided into: i) both the Random Access Preamble and the data part in the Msg1 message are successfully received; ii) the Random Access Preamble in the Msg1 message is not successfully received, but the data part is successfully received; and iii) neither the Random Access Preamble nor the data part in the Msg1 message is successfully received.

The above receiving condition of the Msg2 message can be divided into a condition where an Msg2 message is received and a condition where no Msg2 message is received. Receiving the Msg2 message may refer to: receiving an Msg2 message corresponding to the four-step contention-based random access. Not receiving the Msg2 message may refer to: the terminal side device does not receive an Msg2 message within a receiving window of the Msg2 message or before a timer corresponding to the Msg2 message times out.

In this embodiment, if both a Random Access Preamble and a data part of the Msg1 message corresponding to the two-step contention-based random access are successfully received, the network side device returns the Msg2 message corresponding to the two-step contention-based random access to the terminal side device; or if only the Random Access Preamble in the Msg1 message corresponding to the two-step contention-based random access is successfully received and the data part is not successfully received, the network side device returns, within a receiving window of the Msg2 message or before a timer corresponding to the Msg2 message times out, a Msg2 message corresponding to a four-step contention-based random access to the terminal side device; or if neither the Random Access Preamble nor the data part of the Msg1 message corresponding to the two-step contention-based random access is successfully received, the network side device does not return the Msg2 message to the terminal side device.

In this embodiment, if a Random Access Preamble in the Msg1 message corresponding to the two-step contention-based random access is not successfully received and only the data part is successfully received, the network side device returns the Msg2 corresponding to the two-step contention-based random access to the terminal side device.

In this embodiment, RAPID in the Msg2 message uses a predetermined value, or uses a predetermined domain identifier in a RAR MAC PDU sub-header or a MAC PDU.

In this embodiment, the method further includes: sending, by the network side device, configuration information of parameters about the two-step contention-based random access to the terminal side device.

Optionally, the parameters about the two-step contention-based random access include at least one of:

a maximum number of transmissions of a Random Access Preamble, backoff parameters for re-attempt in case of failure of the random access, power ramping step parameters in a process of the random access, and behaviors of the terminal side device after failure of receiving an entirety or a part of the Msg1 message.

Optionally, the maximum number of transmissions of the Random Access Preamble includes at least one of:

a maximum number of total transmissions of the Random Access Preamble of the two-step contention-based random access, a maximum number of total transmissions of the Random Access Preamble of a four-step contention-based random access, and a maximum number of total transmissions of the Random Access Preamble.

In this embodiment, identical backoff parameters are configured by the network side device for the two-step contention-based random access and a four-step contention-based random access, or different backoff parameters are configured by the network side device for the two-step contention-based random access and the four-step contention-based random access.

In this embodiment, identical power ramping step parameters are configured by the network side device for the two-step contention-based random access and a four-step contention-based random access or different power ramping step parameters are configured by the network side device for the two-step contention-based random access and the four-step contention-based random access; or for the two-step contention-based random access, a power ramping step of the Random Access Preamble and a power ramping step of the data part of the Msg1 message corresponding to the two-step contention-based random access are different.

In this embodiment, the network side device determines how to return the Msg2 message according to a receiving condition of the Msg1 message, and if the terminal side device determines a failure of the two-step contention-based random access occurs according to the returning condition that the network side device returns the Msg2 message, a handling procedure of the two-step contention-based random access is performed. As such, a technical solution for determining a handling procedure for the failure of the two-step contention-based random access is provided, so that the random access procedure of the 5G system can be further perfected.

Further, the terminal side device is also capable of determining the subsequent handling procedure of the failure of the two-step random access according to the returning condition that the network side device returns the Msg2 message, so that the random access procedure of the 5G system could be further perfected.

Embodiment 3

Figure 6:
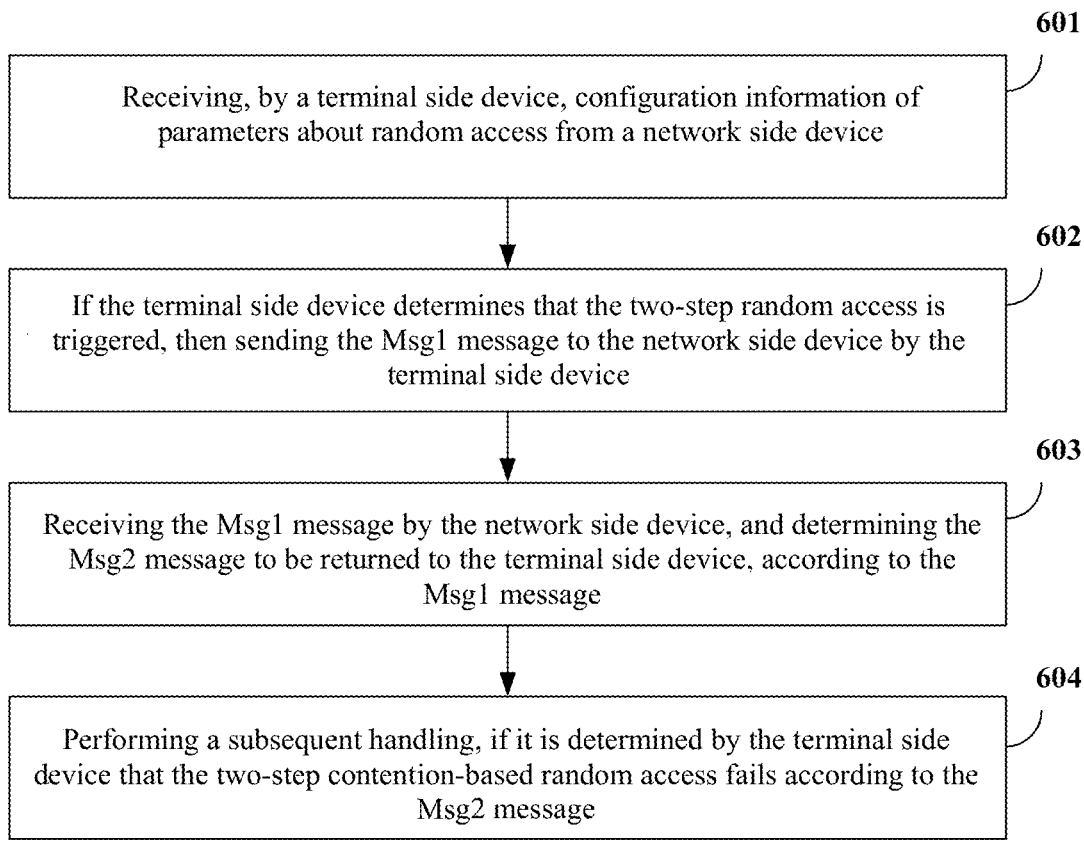
FIG. 6 is a flowchart of a method for contention-based random access in Embodiment 3 of the present disclosure.

Referring to FIG. 6, a flowchart of the method of handling a failure of two-step contention-based random access is shown, specifically with the steps as follows:

Step 601: receiving, by a terminal side device, configuration information of parameters about random access from a network side device.

The network needs to configure parameter(s) for the terminal side device, including at least one of: a maximum number of transmissions of the Random Access Preamble, backoff parameters for re-attempt in case of failure of the two-step contention-based random access, the power ramping step parameters in a process of the two-step contention-based random access, and behaviors of the terminal side device after failure of receiving an entirety or a part of the Msg1 message of the two-step contention-based random access.

Parameters about the random access are mainly configured through broadcast. Alternatively, some (e.g., Backoff parameter) of the parameters about the random access may also be configured through the MAC layer (for example, carried in the MAC sub-header of the RAR MAC PDU).

In this embodiment, the maximum number of transmissions of the Random Access Preamble includes at least one of: a maximum number of total transmissions of the Random Access Preamble of the two-step contention-based random access, and a maximum number of total transmissions of the Random Access Preamble.

In this embodiment, the backoff parameter for the two-step contention-based random access and the backoff parameter for the four-step contention-based random access may be of the same value, or may be of different values.

In this embodiment, the network side device may configure identical or different power ramping steps for two-step contention-based random access and four-step contention-based random access; or for two-step contention-based random access, the Random Access Preamble and the data part of the two-step random access may be of different power ramping steps.

In this embodiment, the behaviors of the terminal side device after the failure of receiving the entirety or a part of the Msg1 message of the two-step contention-based random access includes but is not limited to: continuing to attempt the two-step contention-based random access, or continuing to attempt the four-step contention-based random access, or attempting the two-step contention-based random access for N times (N is the maximum number of total transmissions of the Random Access Preamble of the two-step contention-based random access) and, if the attempting the two-step contention-based random access for N times failed, proceeding to attempt the four-step contention-based random access.

Step 602: if the terminal side device determines that the two-step random access is triggered, then sending the Msg1 message to the network side device by the terminal side device.

In this embodiment, the Msg1 message at least carries a Random Access Preamble, and a data part.

The data part may include at least one of a UE identifier, a scheduling request (SR), a buffer status report (BSR), and real service data.

The Random Access Preamble and the data part may be frequency division multiplexed (FDM), or time division multiplexed (TDM).

Step 603: receiving the Msg1 message by the network side device, and determining the Msg2 message to be returned to the terminal side device, according to the Msg1 message.

That is, the network side device determines how to return the Msg2 message according to a receiving condition of the Msg1 message.

If both the Random Access Preamble and the data part of the Msg1 message of the two-step contention-based random access (including the UE identifier and/or the SR and/or the BSR and/or the real service data) are successfully received, it is determined that the two-step contention-based random access succeeds, and the network side device returns the Msg2 corresponding to the two-step contention-based random access to the terminal side device.

If the Random Access Preamble in the Msg1 message of the two-step contention-based random access is not successfully received, but the data part (including the UE identifier and/or SR and/or BSR and/or real service data) is successfully received, it can also be determined that the two-step contention-based random access succeeds, and the network side device returns the Msg2 message corresponding to the two-step contention-based random access to the terminal side device. The RAPID uses a special value or uses a special domain identifier in the RAR MAC PDU sub-header or MAC PDU.

The above two methods both relate to handling in the case of success of the two-step contention-based random access. The following description relates to handling a failure of contention-based random access.

One possible circumstance of failure of contention-based random access is as follows:

If only the Random Access Preamble in the Msg1 message for the two-step contention-based random access is successfully received and the data part (including the UE identifier and/or the SR and/or the BSR and/or the real service data) is not successfully received, it is determined that the two-step contention-based random access fails for this time, and at this point the network side device returns the Msg2 message corresponding to the four-step contention-based random access to the terminal side device.

Step 604: performing a subsequent handling, if it is determined by the terminal side device that the two-step contention-based random access fails according to the Msg2 message.

If only the Random Access Preamble in the Msg1 message of the two-step contention-based random access is successfully received and the data part (including the UE identifier and/or the SR and/or the BSR and/or the real service data) is not successfully received, the terminal side device receives the Msg2 message corresponding to the four-step contention-based random access returned by the network side device, and after receiving the Msg2 message, the terminal side device switches to the four-step contention-based random access.

In a case that the four-step contention-based random access still fails, if the number of total transmissions of the Random Access Preamble for the two-step contention-based random access and for four-step contention-based random access of the terminal side device does not reach a maximum number of total transmissions of the Random Access Preamble configured by the network for the terminal side device, the terminal side device generates a random backoff value between [0, backoff parameters] according to system information or a backoff mechanism carried in the MAC sub-header of the RAR MAC PDU, and initiates a four-step contention-based random access again according to the backoff value. Identical power ramping step may be configured by the network side device for the two-step contention-based random access and the four-step contention-based random access, or different power ramping steps may be configured by the network side device for the two-step contention-based random access and the four-step contention-based random access. If different power ramping steps are configured by the network side device, the four-step contention-based random access uses the corresponding power ramping step of its own to determine transmission power of the Random Access Preamble.

If the number of total transmissions of the Random Access Preamble for the two-step contention-based random access and for the four-step contention-based random access of the terminal side device reaches the maximum number of total transmissions of the Random Access Preamble configured by the network for the terminal side device, the problem of the random access is reported to a higher layer (RRC layer) of the terminal side device, and the RRC layer of the terminal side device determines that a failure of the radio link access of the terminal side device occurs.

Embodiment 4

Figure 7:
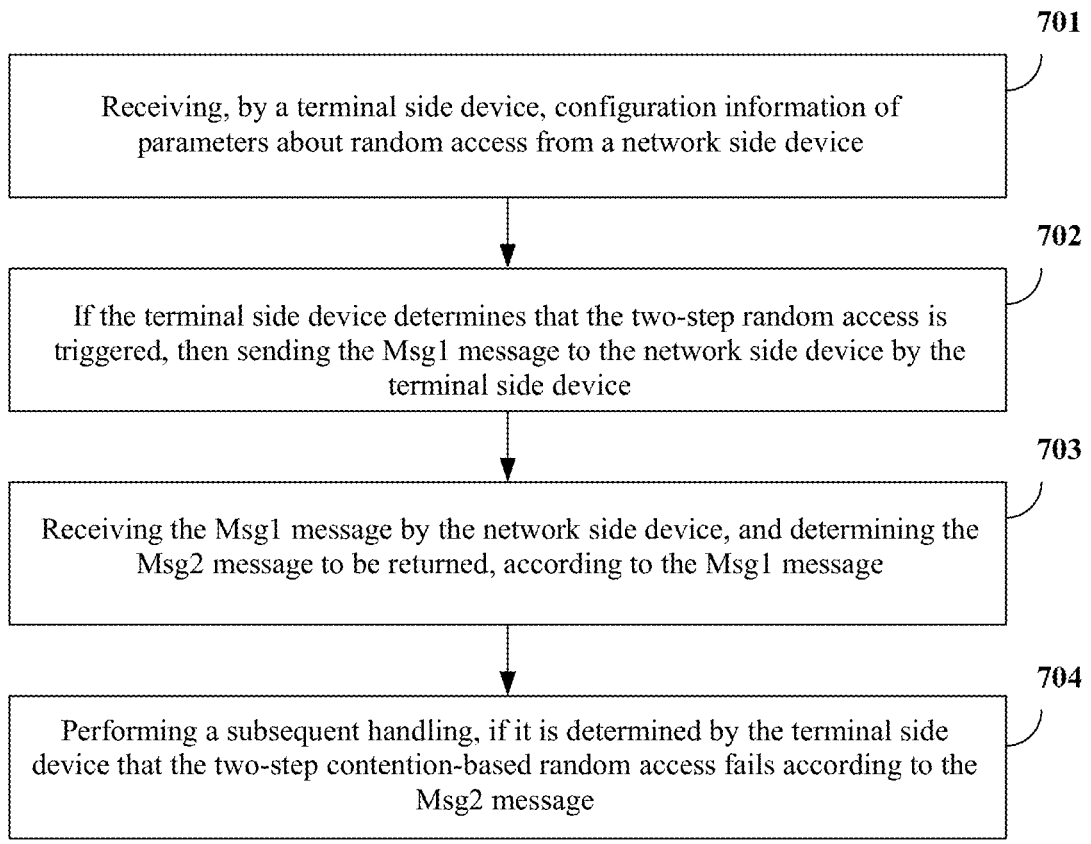
FIG. 7 is a flowchart of a method for contention-based random access in Embodiment 4 of the present disclosure.

Referring to FIG. 7, a flowchart of the method of handling a failure of two-step contention-based random access is shown, specifically with the steps as follows:

Step 701: receiving, by a terminal side device, configuration information of parameters about random access from a network side device.

The network needs to configure parameter(s) for the terminal side device, including at least one of: a maximum number of transmissions of the Random Access Preamble, backoff parameters for re-attempt in case of failure of the random access, the power ramping step parameters in a process of the two-step contention-based random access, and behaviors of the terminal side device after failure of receiving an entirety or a part of the Msg1 message of the two-step contention-based random access.

Parameters about the random access are mainly configured through broadcast. Alternatively, some (e.g., Backoff parameter) of the parameters about the random access may also be configured through the MAC layer (for example, carried in the MAC sub-header of the RAR MAC PDU).

In this embodiment, the maximum number of transmissions of the Random Access Preamble includes at least one of: a maximum number of total transmissions of the Random Access Preamble of the two-step contention-based random access, and a maximum number of total transmissions of the Random Access Preamble.

In this embodiment, the backoff parameter for the two-step contention-based random access and the backoff parameter for the four-step contention-based random access may be of the same value, or may be of different values.

In this embodiment, the network side device may configure identical or different power ramping steps for two-step contention-based random access and four-step contention-based random access; or for two-step contention-based random access, the Random Access Preamble and the data part of the two-step random access may be of different power ramping steps.

In this embodiment, the behaviors of the terminal side device after the failure of receiving the entirety or a part of the Msg1 message of the two-step contention-based random access includes: continuing to attempt the two-step contention-based random access, or continuing to attempt the four-step contention-based random access, or attempting the two-step contention-based random access for N times (N is the maximum number of total transmissions of the Random Access Preamble of the two-step contention-based random access) and, if the attempting the two-step contention-based random access for N times failed, proceeding to attempt the four-step contention-based random access.

Step 702: if the terminal side device determines that the two-step random access is triggered, then sending the Msg1 message to the network side device by the terminal side device.

The Msg1 message at least carries a Random Access Preamble, and a data part.

In this embodiment, the data part may include at least one of a UE identifier, a scheduling request (SR), a buffer status report (BSR), and real service data.

The Random Access Preamble and the data part may be frequency division multiplexed (FDM), or time division multiplexed (TDM).

Step 703: receiving the Msg1 message by the network side device, and determining the Msg2 message to be returned, according to the Msg1 message.

That is, the network side device determines how to return the Msg2 message according to a receiving condition of the Msg1 message.

If both the Random Access Preamble and the data part of the Msg1 message of the two-step contention-based random access (including the UE identifier and/or the SR and/or the BSR and/or the real service data) are successfully received, it is determined that the two-step contention-based random access succeeds, and the network side device returns the Msg2 corresponding to the two-step contention-based random access to the terminal side device.

If the Random Access Preamble in the Msg1 message of the two-step contention-based random access is not successfully received, but the data part (including the UE identifier and/or SR and/or BSR and/or real service data) is successfully received, it can also be determined that the two-step contention-based random access succeeds, and the network side device returns the Msg2 message corresponding to the two-step contention-based random access to the terminal side device. The RAPID uses a special value or uses a special domain identifier in the RAR MAC PDU sub-header or MAC PDU.

The above two methods both relate to handling in the case of success of the two-step contention-based random access. The following description relates to handling a failure of contention-based random access.

One possible circumstance of failure of contention-based random access is as follows:

If neither the Random Access Preamble nor the data part (including the UE identifier and/or the SR and/or the BSR and/or the real service data) in the Msg1 message for the two-step contention-based random access is successfully received, it is determined that the two-step contention-based random access fails for this time, and at this point the network side device does not return the Msg2 message to the terminal side device.

Step 704: performing a subsequent handling, if it is determined by the terminal side device that the two-step contention-based random access fails according to the Msg2 message.

If neither the Random Access Preamble nor the data part (including the UE identifier and/or the SR and/or the BSR and/or the real service data) in the Msg1 message for the two-step contention-based random access is successfully received, there are the following three handling methods, and which handling method is to be used can be determined by the terminal side device itself or by configuration or agreed protocol of the network side device.

Option I: The terminal side device continues to attempt the two-step contention-based random access until:

the contention-based random access succeeds; or a maximum number of total transmissions of Random Access Preamble configured by the network side device for the terminal side device is reached, then the contention-based random access is determined to be failed; or in the process of the two-step random access, if the circumstance mentioned in the embodiment 3 that the Random Access Preamble is successfully received and the data part is not successfully received occurs, the embodiment 3 is to apply.

Option II: The terminal side device directly switches to the four-step contention-based random access to make an attempt until:

the contention-based random access succeeds; or a maximum number of total transmissions of Random Access Preamble configured by the network side device for the terminal side device is reached, then the contention-based random access is determined to be failed.

Option III: The terminal side device continues to attempt the two-step contention-based random access until:

the contention-based random access succeeds; or after the maximum number of total transmissions of Random Access Preambles of the two-step contention-based random access configured by the network side device for the terminal side device is reached, the process switches to the four-step contention-based random access until the four-step contention-based random access succeeds or the maximum number of total transmissions of Random Access Preambles configured by the network for the terminal side device is reached, which determines that the contention-based random access fails; or in the process of the two-step random access, if the circumstance mentioned in the embodiment 3 that the Random Access Preamble is successfully received and the data part is not successfully received occurs, the embodiment 3 is to apply.

For the above three optional handling methods:

If the number of total transmissions of the Random Access Preamble for the two-step contention-based random access and for the four-step contention-based random access of the terminal side device does not reach the maximum number of total Random Access Preambles configured by the network for the terminal side device, it is allowed to continue to attempt the random access. For each random access attempt, the terminal side device generates a random backoff value between [0, backoff parameters] according to system information or a backoff mechanism carried in the MAC sub-header of the RAR MAC PDU, and initiates a four-step contention-based random access again according to the backoff value. Identical power ramping step may be configured by the network side device for the two-step contention-based random access and the four-step contention-based random access, or different power ramping steps may be configured by the network side device for the two-step contention-based random access and the four-step contention-based random access. If different power ramping steps are configured by the network side device, the two-step contention-based random access uses the corresponding power ramping step of its own to determine transmission power of the Random Access Preamble. Correspondingly, the four-step contention-based random access uses the corresponding power ramping step of its own to determine transmission power of the Random Access Preamble.

If the number of total transmissions of the Random Access Preamble for the two-step contention-based random access and for the four-step contention-based random access of the terminal side device reaches the maximum number of total transmissions of the Random Access Preamble configured by the network for the terminal side device, the problem of the random access is reported to a higher layer (RRC layer) of the terminal side device, and the RRC layer of the terminal side device determines that a failure of the radio link access of the terminal side device occurs.

Embodiment 5

Figure 8:
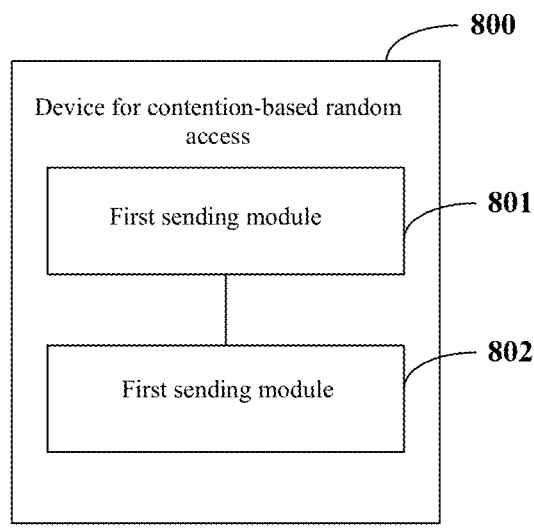
FIG. 8 is a block diagram of a device for contention-based random access in Embodiment 5 of the present disclosure.

Referring to FIG. 8, a device for contention-based random access applied to a terminal side device is shown, the device 800 including:

a first sending module 801 configured to send, to a network side device, an Msg1 message corresponding to a two-step contention-based random access; and a first processing module 802 configured to receive an Msg2 message returned by the network side device, wherein if the terminal side device determines a failure of the two-step contention-based random access occurs according to a receiving condition of the Msg2 message, the terminal side device performs a handling procedure for the failure of the two-step contention-based random access, and the Msg2 message is determined by the network side device according to a receiving condition that the network side device receives the Msg1 message.

In this embodiment, optionally, the Msg1 message at least carries a Random Access Preamble, and a data part.

The above receiving condition of the Msg2 message can be divided into a condition where an Msg2 message is received and a condition where no Msg2 message is received. Receiving the Msg2 message may refer to: receiving an Msg2 message corresponding to the four-step contention-based random access. Not receiving the Msg2 message may refer to: the terminal side device does not receive an Msg2 message within a receiving window of the Msg2 message or before a timer corresponding to the Msg2 message times out.

In this embodiment, the first processing module 802 is further configured to: if only the Random Access Preamble in the Msg1 message is successfully received by the network side device and the data part is not successfully received by the network side device, receive, within a receiving window of the Msg2 message or before a timer corresponding to the Msg2 message times out, a Msg2 message corresponding to a four-step contention-based random access returned by the network side device, and the terminal side device switches to the four-step contention-based random access.

Optionally, in the embodiment, the Msg1 message at least carries a Random Access Preamble, and a data part. Optionally, the data part includes at least one of a terminal identifier, a scheduling request (SR), a buffer status report (BSR), and real service data.

Further, the Random Access Preamble and the data part are frequency division multiplexed (FDM), or time division multiplexed (TDM).

The above receiving condition of the Msg1 message can be divided into: i) both the Random Access Preamble and the data part in the Msg1 message are successfully received; ii) the Random Access Preamble in the Msg1 message is not successfully received, but the data part is successfully received; and iii) neither the Random Access Preamble nor the data part in the Msg1 message is successfully received.

In this embodiment, the terminal side device determines whether the two-step contention-based random access fails according to a returning condition that the network side device returns the Msg2 message. The Msg2 message is determined by the network side device according to a receiving condition of the Msg1 message. If a failure of the two-step contention-based random access is determined, the process proceeds to handle the two-step contention-based random access. As such, a technical solution for determining a handling procedure of a failure of the two-step random access is provided, so that the random access procedure of the 5G system can be further perfected.

After determining that a failure of the two-step random access occurs, the terminal side device may further determine a subsequent handling procedure of the failure of the two-step random access according to the receiving condition of the Msg2 message, so that the random access procedure of the 5G system could be further perfected.

In this embodiment, the first processing module 802 is further configured to: if neither the Random Access Preamble nor the data part in the Msg1 message corresponding to the two-step contention-based random access is successfully received, be incapable of receiving the Msg2 message within a receiving window of the Msg2 message or before a timer corresponding to the Msg2 message times out, and continue to attempt the two-step contention-based random access until one of following (1)-(3):

(1) the two-step contention-based random access succeeds; or (2) if a maximum number of total transmissions of the Random Access Preamble configured by the network side device for the terminal side device is reached, then the contention-based random access is determined to be failed; or (3) in a process of attempting the two-step contention-based random access, if only the Random Access Preamble in the Msg1 message corresponding to the two-step contention-based random access is successfully received by the network side device and the data part is not successfully received by the network side device, the terminal side device receives, within the receiving window of the Msg2 message or before the timer corresponding to the Msg2 message times out, the Msg2 message corresponding to a four-step contention-based random access returned by the network side device, and the terminal side device switches to the four-step contention-based random access.

In this embodiment, the first processing module 802 is further configured to: if neither the Random Access Preamble nor the data part in the Msg1 message corresponding to the two-step contention-based random access is successfully received, be incapable of receiving the Msg2 message within a receiving window of the Msg2 message or before a timer corresponding to the Msg2 message times out, and directly switch to a four-step contention-based random access to make an attempt until one of following (1)-(2):

(1) the four-step contention-based random access succeeds; or (2) if a maximum number of total transmissions of the Random Access Preamble configured by the network side device for the terminal side device is reached, then the contention-based random access is determined to fail.

In this embodiment, the first processing module 802 is further configured to: if neither the Random Access Preamble nor the data part of the Msg1 message corresponding to the two-step contention-based random access is successfully received, be incapable of receiving the Msg2 message within a receiving window of the Msg2 message or before a timer corresponding to the Msg2 message times out, and continue to attempt the two-step contention-based random access until one of following (1)-(3):

(1) the two-step contention-based random access succeeds; or (2) if a maximum number of total transmissions of the Random Access Preamble of the two-step contention-based random access configured by the network side device for the terminal side device is reached, a four-step contention-based random access is performed until the four-step contention-based random access succeeds, or if a maximum number of total transmissions of the Random Access Preamble of the four-step contention-based random access configured by the network side device for the terminal side device is reached, the contention-based random access is determined to fail; or (3) in a process of attempting the two-step contention-based random access, if only the Random Access Preamble in the Msg1 message corresponding to the two-step contention-based random access is successfully received by the network side device and the data part is not successfully received by the network side device, the terminal side device receives, within the receiving window of the Msg2 message or before the timer corresponding to the Msg2 message times out, a Msg2 message corresponding to the four-step contention-based random access returned by the network side device, and the terminal side device switches to the four-step contention-based random access.

In this embodiment, the data part includes at least one of a terminal identifier, a scheduling request (SR), a buffer status report (BSR), and real service data.

In this embodiment, the Random Access Preamble and the data part are frequency division multiplexed (FDM), or time division multiplexed (TDM).

In this embodiment, the first processing module is further configured to:

in case of each failure of the contention-based random access, back off for a random period of time according to backoff parameters configured by the network side device and then attempt the two-step contention-based random access or a four-step contention-based random access again.

In this embodiment, identical backoff parameters are configured by the network side device for the two-step contention-based random access and the four-step contention-based random access, or different backoff parameters are configured by the network side device for the two-step contention-based random access and the four-step contention-based random access.

In this embodiment, identical power ramping step parameters are configured by the network side device for the two-step contention-based random access and a four-step contention-based random access or different power ramping step parameters are configured by the network side device for the two-step contention-based random access and the four-step contention-based random access; or for the two-step contention-based random access, a power ramping step of the Random Access Preamble and a power ramping step of the data part of the Msg1 message corresponding to the two-step contention-based random access are different.

In this embodiment, the first processing module is further configured to: if a number of total transmissions of the Random Access Preamble of the two-step contention-based random access and/or the four-step contention-based random access of the terminal side device reaches a maximum number of total transmissions of the Random Access Preamble configured by the network side device for the terminal side device, a problem of the contention-based random access is reported to a higher layer, and the higher layer determines that a radio link of the terminal side device fails.

In this embodiment, the device further includes a first receiving module configured to configuration information of parameters about the two-step contention-based random access from the network side device.

Optionally, the parameters about the two-step contention-based random access include at least one of:

a maximum number of transmissions of the Random Access Preamble, backoff parameters for re-attempt in case of failure of the random access, the power ramping step parameters in a process of the random access, and behaviors of the terminal side device after failure of receiving an entirety or a part of the Msg1 message.

Optionally, the maximum number of transmissions of the Random Access Preamble includes at least one of:

a maximum number of total transmissions of the Random Access Preamble of the two-step contention-based random access, a maximum number of total transmissions of the Random Access Preamble of the four-step contention-based random access, and a maximum number of total transmissions of the Random Access Preamble.

Optionally, the behaviors of the terminal side device after the failure of receiving the entirety or a part of the Msg1 message includes: continuing to attempt the two-step contention-based random access by the terminal side device, or continuing to attempt the four-step contention-based random access by the terminal side device, or attempting the two-step contention-based random access for N times by the terminal side device and, if the attempting the two-step contention-based random access for N times failed, proceeding to attempt the four-step contention-based random access by the terminal side device, wherein N is the maximum number of total transmissions of the Random Access Preamble of the two-step contention-based random access.

In this embodiment, the terminal side device determines whether the two-step contention-based random access fails according to a returning condition that the network side device returns the Msg2 message. The Msg2 message is determined by the network side device according to a receiving condition of the Msg1 message. If a failure of the two-step contention-based random access is determined, a handling procedure for the failure of the two-step contention-based random access is performed. As such, a technical solution for determining a handling procedure for the failure of the two-step contention-based random access is provided, so that the random access procedure of the 5G system can be further perfected.

Further, the terminal side device can determine the subsequent handling procedure of the failure of the two-step random access according to the returning condition that the network side device returns the Msg2 message, so that the random access procedure of the 5G system could be further perfected.

Embodiment 6

Figure 9:
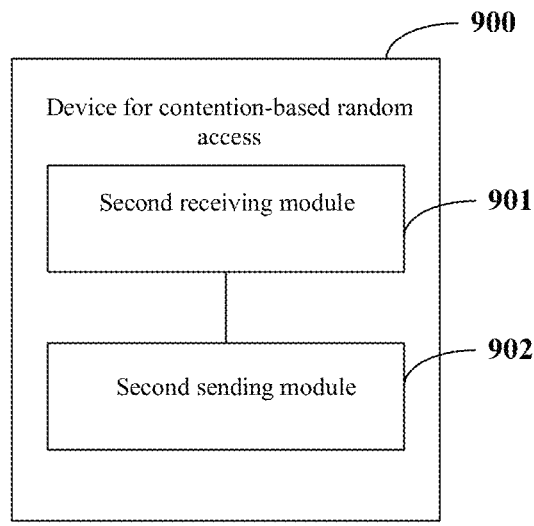
FIG. 9 is a block diagram of a device for contention-based random access in Embodiment 6 of the present disclosure.

Referring to FIG. 9, a device for contention-based random access is applied to a network side device is shown, the device 900 including:

a second receiving module 901 configured to receive an Msg1 message corresponding to a two-step contention-based random access sent by a terminal side device;

wherein in this embodiment, optionally, the Msg1 message at least carries a Random Access Preamble, and a data part; and optionally, the data part includes at least one of a terminal identifier, a scheduling request (SR), a buffer status report (BSR), and real service data;

further, the Random Access Preamble and the data part are frequency division multiplexed (FDM), or time division multiplexed (TDM); and a second sending module 902 configured to determine an Msg2 message according to a receiving condition of the Msg1 message, and return the Msg2 message to the terminal side device, wherein if the terminal side device determines a failure of the two-step contention-based random occurs according to the receiving condition of the Msg2 message, the terminal side device performs a handling procedure for the failure of the two-step contention-based random access.

The above receiving condition of the Msg1 message can be divided into: i) both the Random Access Preamble and the data part in the Msg1 message are successfully received; ii) the Random Access Preamble in the Msg1 message is not successfully received, but the data part is successfully received; and iii) neither the Random Access Preamble nor the data part in the Msg1 message is successfully received.

The above receiving condition of the Msg2 message can be divided into a condition where an Msg2 message is received and a condition where no Msg2 message is received. Receiving the Msg2 message may refer to: receiving an Msg2 message corresponding to the four-step contention-based random access. Not receiving the Msg2 message may refer to: the terminal side device does not receive an Msg2 message within a receiving window of the Msg2 message or before a timer corresponding to the Msg2 message times out.

In this embodiment, the second sending module 902 is further configured to: if both a Random Access Preamble and a data part of the Msg1 message corresponding to the two-step contention-based random access are successfully received, return the Msg2 message corresponding to the two-step contention-based random access to the terminal side device; or if only the Random Access Preamble in the Msg1 message corresponding to the two-step contention-based random access is successfully received and the data part is not successfully received, return, within a receiving window of the Msg2 message or before a timer corresponding to the Msg2 message times out, a Msg2 message corresponding to a four-step contention-based random access to the terminal side device; or if neither the Random Access Preamble nor the data part of the Msg1 message corresponding to the two-step contention-based random access is successfully received, not return the Msg2 message to the terminal side device.

In this embodiment, the second sending module 902 is further configured to: if a Random Access Preamble in the Msg1 message corresponding to the two-step contention-based random access is not successfully received and only the data part is successfully received, return the Msg2 corresponding to the two-step contention-based random access to the terminal side device.

In this embodiment, RAPID in the Msg2 message uses a predetermined value, or uses a predetermined domain identifier in a RAR MAC PDU sub-header or a MAC PDU.

In this embodiment, the device further includes a third sending module configured to send configuration information of parameters about the two-step contention-based random access to the terminal side device.

In this embodiment, the parameters about the two-step contention-based random access include at least one of:

a maximum number of transmissions of a Random Access Preamble, backoff parameters for re-attempt in case of failure of the random access, power ramping step parameters in a process of the random access, and behaviors of the terminal side device after failure of receiving an entirety or a part of the Msg1 message.

In this embodiment, the maximum number of transmissions of the Random Access Preamble includes at least one of:

a maximum number of total transmissions of the Random Access Preamble of the two-step contention-based random access, a maximum number of total transmissions of the Random Access Preamble of a four-step contention-based random access, and a maximum number of total transmissions of the Random Access Preamble.

In this embodiment, identical backoff parameters are configured by the network side device for the two-step contention-based random access and a four-step contention-based random access, or different backoff parameters are configured by the network side device for the two-step contention-based random access and the four-step contention-based random access.

In this embodiment, identical power ramping step parameters are configured by the network side device for the two-step contention-based random access and a four-step contention-based random access or different power ramping step parameters are configured by the network side device for the two-step contention-based random access and the four-step contention-based random access; or for the two-step contention-based random access, a power ramping step of the Random Access Preamble and a power ramping step of the data part of the Msg1 message corresponding to the two-step contention-based random access are different.

In this embodiment, the network side device determines how to return the Msg2 message according to a receiving condition of the Msg1 message, and if the terminal side device determines a failure of the two-step contention-based random access occurs according to the returning condition that the network side device returns the Msg2 message, a handling procedure of the two-step contention-based random access is performed. As such, a technical solution for determining a handling procedure for the failure of the two-step contention-based random access is provided, so that the random access procedure of the 5G system can be further perfected.

Further, the terminal side device is also capable of determining the subsequent handling procedure of the failure of the two-step random access according to the returning condition that the network side device returns the Msg2 message, so that the random access procedure of the 5G system could be further perfected.

Based on the same inventive concept, embodiments of the present disclosure further provide a terminal side device. The principle how the terminal side device solves the problem is similar to that of the method for contention-based random access according to the embodiment of the present disclosure shown in FIG. 4. For implementation of the terminal side device, please refer to the implementation of the method, and a repeated description is omitted herein.

Embodiment 7

Figure 10:
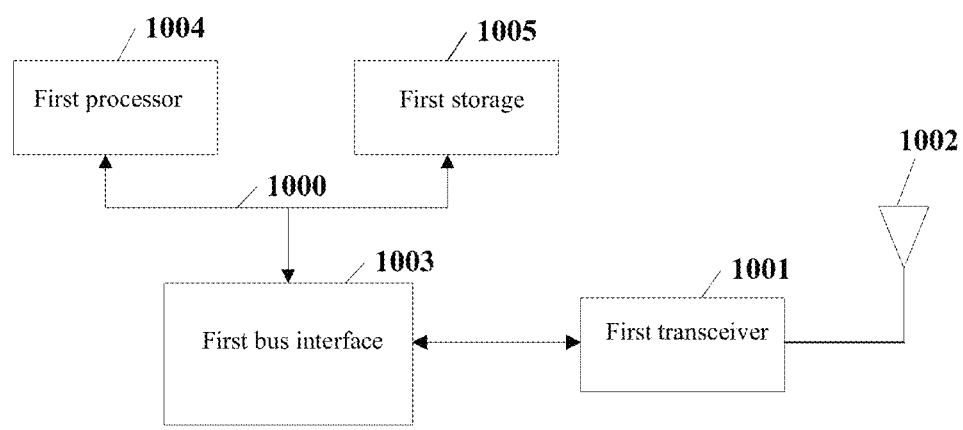
FIG. 10 is a schematic structural diagram of a terminal side device in Embodiment 7 of the present disclosure.

Referring to FIG. 10, an embodiment of the present disclosure provides a terminal side device, including:

a first processor 1004 configured to read a program in a first storage 1005 and execute the following process:

sending, by a first transceiver 1001, an Msg1 message corresponding to a two-step contention-based random access to a network side device;

receiving, by the first transceiver 1001, an Msg2 message returned by the network side device, wherein if the terminal side device determines a failure of the two-step contention-based random access occurs according to a receiving condition of the Msg2 message, the terminal side device performs a handling procedure for the failure of the two-step contention-based random access, wherein the Msg2 message is determined by the network side device according to a receiving condition that the network side device receives the Msg1 message; and the first transceiver 1001, which is configured to receive and transmit data under the control of the first processor 1004.

In FIG. 10, the bus architecture (represented by a first bus 1000) can include any number of interconnected buses and bridges, and the first bus 1000 links one or more processors represented by the processor 1004 and various circuits of the storage represented by a first storage 1005 together. The first bus 1000 can also link various other circuits, such as peripherals, voltage regulators, and power management circuits together. These components are known in the art, and therefore will not be further described herein. A bus interface 1003 provides an interface between the first bus 1000 and the first transceiver 1001. The first transceiver 1001 can be one element or a plurality of elements, such as a plurality of receivers and transmitters, providing units for communicating with various other devices on a transmission medium. Data processed by the processor 1004 is transmitted on a wireless medium via the first transceiver 1001 and a first antenna 1002. Further, the first antenna 502 also receives data and transmits the data to the first processor 1004 via the first transceiver 1001.

The first processor 1004 is responsible for managing the first bus 1000 and normal processing, and can also provide various functions, including timing, peripheral interfaces, voltage regulation, power management, and other control functions, whereas the first storage 1005 can be used to store data used by the first processor 1004 when executing operations. Specifically, the first processor 1004 can be a CPU, an ASIC, a FPGA, or a CPLD.

Optionally, the Msg1 message at least carries a Random Access Preamble, and a data part.

Optionally, the first processor 1004 is specifically configured to: if only the Random Access Preamble in the Msg1 message is successfully received by the network side device and the data part is not successfully received by the network side device, receive, within a receiving window of the Msg2 message or before a timer corresponding to the Msg2 message times out, a Msg2 message corresponding to a four-step contention-based random access returned by the network side device, and the terminal side device switches to the four-step contention-based random access.

Optionally, the first processor 1004 is specifically configured to: if neither the Random Access Preamble nor the data part in the Msg1 message corresponding to the two-step contention-based random access is successfully received, be incapable of receiving the Msg2 message within a receiving window of the Msg2 message or before a timer corresponding to the Msg2 message times out, and continue to attempt the two-step contention-based random access until one of following (1)-(3):

(1) the two-step contention-based random access succeeds; or (2) if a maximum number of total transmissions of the Random Access Preamble configured by the network side device for the terminal side device is reached, then the contention-based random access is determined to be failed; or (3) in a process of attempting the two-step contention-based random access, if only the Random Access Preamble in the Msg1 message corresponding to the two-step contention-based random access is successfully received by the network side device and the data part is not successfully received by the network side device, the terminal side device receives, within the receiving window of the Msg2 message or before the timer corresponding to the Msg2 message times out, the Msg2 message corresponding to a four-step contention-based random access returned by the network side device, and the terminal side device switches to the four-step contention-based random access.

Optionally, the first processor 1004 is specifically configured to: if neither the Random Access Preamble nor the data part in the Msg1 message corresponding to the two-step contention-based random access is successfully received, be incapable of receiving the Msg2 message within a receiving window of the Msg2 message or before a timer corresponding to the Msg2 message times out, and directly switch to a four-step contention-based random access to make an attempt until one of following (1)-(2):

(1) the four-step contention-based random access succeeds; or (2) if a maximum number of total transmissions of the Random Access Preamble configured by the network side device for the terminal side device is reached, then the contention-based random access is determined to fail.

Optionally, the first processor 1004 is specifically configured to: if neither the Random Access Preamble nor the data part of the Msg1 message corresponding to the two-step contention-based random access is successfully received, be incapable of receiving the Msg2 message within a receiving window of the Msg2 message or before a timer corresponding to the Msg2 message times out, and continue to attempt the two-step contention-based random access until one of following (1)-(3):

(1) the two-step contention-based random access succeeds; or (2) if a maximum number of total transmissions of the Random Access Preamble of the two-step contention-based random access configured by the network side device for the terminal side device is reached, a four-step contention-based random access is performed until the four-step contention-based random access succeeds, or if a maximum number of total transmissions of the Random Access Preamble of the four-step contention-based random access configured by the network side device for the terminal side device is reached, the contention-based random access is determined to fail; or (3) in a process of attempting the two-step contention-based random access, if only the Random Access Preamble in the Msg1 message corresponding to the two-step contention-based random access is successfully received by the network side device and the data part is not successfully received by the network side device, the terminal side device receives, within the receiving window of the Msg2 message or before the timer corresponding to the Msg2 message times out, a Msg2 message corresponding to the four-step contention-based random access returned by the network side device, and the terminal side device switches to the four-step contention-based random access.

Optionally, the data part includes at least one of a terminal identifier, a scheduling request (SR), a buffer status report (BSR), and real service data.

Optionally, the Random Access Preamble and the data part are frequency division multiplexed (FDM), or time division multiplexed (TDM).

Optionally, the first processor 1004 is specifically configured to: in case of each failure of the contention-based random access, back off for a random period of time according to backoff parameters configured by the network side device and then attempt the two-step contention-based random access or a four-step contention-based random access again.

Optionally, identical backoff parameters are configured by the network side device for the two-step contention-based random access and the four-step contention-based random access, or different backoff parameters are configured by the network side device for the two-step contention-based random access and the four-step contention-based random access.

Optionally, identical power ramping step parameters are configured by the network side device for the two-step contention-based random access and a four-step contention-based random access or different power ramping step parameters are configured by the network side device for the two-step contention-based random access and the four-step contention-based random access; or for the two-step contention-based random access, a power ramping step of the Random Access Preamble and a power ramping step of the data part of the Msg1 message corresponding to the two-step contention-based random access are different.

Optionally, the first processor 1004 is specifically configured to: if a number of total transmissions of the Random Access Preamble of the two-step contention-based random access and/or the four-step contention-based random access of the terminal side device reaches a maximum number of total transmissions of the Random Access Preamble configured by the network side device for the terminal side device, a problem of the contention-based random access is reported to a higher layer, and the higher layer determines that a radio link of the terminal side device fails.

Optionally, the first transceiver is further configured to receive configuration information of parameters about the two-step contention-based random access from the network side device.

Optionally, the parameters about the two-step contention-based random access include at least one of:

a maximum number of transmissions of the Random Access Preamble, backoff parameters for re-attempt in case of failure of the random access, the power ramping step parameters in a process of the random access, and behaviors of the terminal side device after failure of receiving an entirety or a part of the Msg1 message.

Optionally, the maximum number of transmissions of the Random Access Preamble includes at least one of:

a maximum number of total transmissions of the Random Access Preamble of the two-step contention-based random access, a maximum number of total transmissions of the Random Access Preamble of the four-step contention-based random access, and a maximum number of total transmissions of the Random Access Preamble.

Optionally, the behaviors of the terminal side device after the failure of receiving the entirety or a part of the Msg1 message includes: continuing to attempt the two-step contention-based random access by the terminal side device, or continuing to attempt the four-step contention-based random access by the terminal side device, or attempting the two-step contention-based random access for N times by the terminal side device and, if the attempting the two-step contention-based random access for N times failed, proceeding to attempt the four-step contention-based random access by the terminal side device, wherein N is the maximum number of total transmissions of the Random Access Preamble of the two-step contention-based random access.

Based on the same inventive concept, embodiments of the present disclosure further provide a network side device. The principle how the network side device solves the problem is similar to that of the method for contention-based random access according to the embodiment of the present disclosure shown in FIG. 5. For implementation of the network side device, please refer to the implementation of the method, and a repeated description is omitted herein.

Embodiment 8

Figure 11:
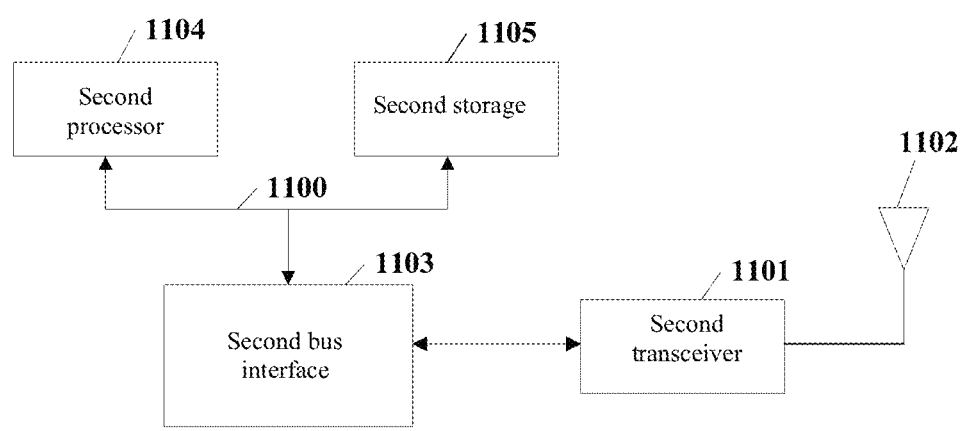
FIG. 11 is a schematic structural diagram of a network side device in Embodiment 8 of the present disclosure.

Referring to FIG. 11, an embodiment of the present disclosure provides a network side device, including:

a second processor 1104 configured to read a program in a second storage 1105 and execute the following process:

receiving, by a second transceiver 1101, an Msg1 message corresponding to two-step contention-based random access sent by a terminal side device; and determining, by the second transceiver 1101, an Msg2 message according to a receiving condition of the Msg1 message, and returning the Msg2 message to the terminal side device, wherein if the terminal side device determines a failure of the two-step contention-based random occurs according to the receiving condition of the Msg2 message, the terminal side device performs a handling procedure for the failure of the two-step contention-based random access; and the second transceiver 1101, which is configured to receive and transmit data under the control of the second processor 1104.

In FIG. 11, the bus architecture (represented by a second bus 1100) can include any number of interconnected buses and bridges, and the second bus 1100 links one or more processors represented by the first processor 1104 and various circuits of the storage represented by a second storage 1105 together. The second bus 1100 can also link various other circuits, such as peripherals, voltage regulators, and power management circuits together. These components are known in the art, and therefore will not be further described herein. A second bus interface 1103 provides an interface between the second bus 1100 and the second transceiver 1101. The second transceiver 1101 can be one element or a plurality of elements, such as a plurality of receivers and transmitters, providing units for communicating with various other devices on a transmission medium. Data processed by the second processor 1104 is transmitted on a wireless medium via the second transceiver 1001 and a second antenna 1002. Further, the second antenna 502 also receives data and transmits the data to the first processor 1104 via the second transceiver 1101.

The second processor 1104 is responsible for managing the second bus 1100 and normal processing, and can also provide various functions, including timing, peripheral interfaces, voltage regulation, power management, and other control functions, whereas the second storage 1105 can be used to store data used by the second processor 1104 when executing operations. Specifically, the first processor 1004 can be a CPU, an ASIC, a FPGA, or a CPLD.

Optionally, the second processor 1104 is specifically configured to:

if both a Random Access Preamble and a data part of the Msg1 message corresponding to the two-step contention-based random access are successfully received, return the Msg2 message corresponding to the two-step contention-based random access to the terminal side device; or if only the Random Access Preamble in the Msg1 message corresponding to the two-step contention-based random access is successfully received and the data part is not successfully received, return, within a receiving window of the Msg2 message or before a timer corresponding to the Msg2 message times out, a Msg2 message corresponding to a four-step contention-based random access to the terminal side device; or if neither the Random Access Preamble nor the data part of the Msg1 message corresponding to the two-step contention-based random access is successfully received, not return the Msg2 message to the terminal side device.

Optionally, the second processor 1104 is specifically configured to:

if a Random Access Preamble in the Msg1 message corresponding to the two-step contention-based random access is not successfully received and only the data part is successfully received, return the Msg2 corresponding to the two-step contention-based random access to the terminal side device.

Optionally, RAPID in the Msg2 message uses a predetermined value, or uses a predetermined domain identifier in a RAR MAC PDU sub-header or a MAC PDU.

Optionally, in this embodiment, the second transceiver 1101 is further configured to send configuration information of parameters about the two-step contention-based random access to the terminal side device.

Optionally, the parameters about the two-step contention-based random access include at least one of:

a maximum number of transmissions of a Random Access Preamble, backoff parameters for re-attempt in case of failure of the random access, power ramping step parameters in a process of the random access, and behaviors of the terminal side device after failure of receiving an entirety or a part of the Msg1 message.

Optionally, the maximum number of transmissions of the Random Access Preamble includes at least one of:

a maximum number of total transmissions of the Random Access Preamble of the two-step contention-based random access, a maximum number of total transmissions of the Random Access Preamble of a four-step contention-based random access, and a maximum number of total transmissions of the Random Access Preamble.

Optionally, identical backoff parameters are configured by the network side device for the two-step contention-based random access and a four-step contention-based random access, or different backoff parameters are configured by the network side device for the two-step contention-based random access and the four-step contention-based random access.

Optionally, identical power ramping step parameters are configured by the network side device for the two-step contention-based random access and a four-step contention-based random access or different power ramping step parameters are configured by the network side device for the two-step contention-based random access and the four-step contention-based random access; or for the two-step contention-based random access, a power ramping step of the Random Access Preamble and a power ramping step of the data part of the Msg1 message corresponding to the two-step contention-based random access are different.

It is to be understood that the phrase "one embodiment" or "an embodiment" mentioned throughout the specification means that particular features, structures or characteristics related to the embodiment are included in at least one embodiment of the present disclosure. Therefore, the phrase "in one embodiment" or "in an embodiment" appearing at various parts of the entire specification does not necessarily refer to the same embodiment. In addition, these particular features, structures, or characteristics may be combined in any suitable manner in one or more embodiments.

In various embodiments of the present disclosure, it should be understood that the magnitude of the serial numbers of the above processes does not mean the order of execution, and the order of execution of each process should be determined by its function and internal logic, and should not limit the implementation process of the embodiments of the present disclosure.

Additionally, the terms "system" and "network" are used interchangeably herein.

It should be understood that the term "and/or" as used herein is merely to describe an association relationship of associated objects, indicating that there may be three relationships. For example, A and/or B may indicate the following three situations: A exists separately, A and B exist simultaneously, and B exists separately. In addition, the character "/" as used herein generally indicates that the associated objects are of an "or" relationship.

In the embodiments provided by the present disclosure, it should be understood that "B corresponding to A" means that B is associated with A, and B can be determined according to A. However, it should also be understood that determining B according to A does not mean that B is determined only according to A; instead, B can also be determined according to A and/or other information.

In the several embodiments provided by the present disclosure, it should be understood that the disclosed method and device may be implemented in other manners. For example, the device embodiments described above are merely illustrative. For example, the division of the units is only a division in terms of logical function. In actual implementation, there may also be other division manners; for example, multiple units or components may be combined or integrated into another system, or some features can be omitted or not executed. In addition, the mutual coupling or direct coupling or communication connection as shown or discussed may be an indirect coupling or communication connection through some interfaces, devices or units, and may be in electrical, mechanical or other forms.

In addition, individual functional units in various embodiments of the present disclosure may be integrated into one processing unit, or individual units may be physically included separately, or two or more units may be integrated into one unit. The above integrated unit can be implemented in the form of hardware or in the form of a combination of hardware functional units and software functional units.

The above described integrated unit implemented in the form of software functional unit can be stored in a computer readable storage medium. The above software functional unit is stored in a storage medium and includes a plurality of instructions for enabling a computer device (which may be a personal computer, a server, or a network side device, etc.) to execute part of the steps of the transceiving method of the various embodiments of the present disclosure. The foregoing storage medium includes: a U disk, a mobile hard disk, a Read-Only Memory (ROM), a Random Access Memory (RAM), a magnetic disk or an optical disk, and various media that can store program codes thereon.

Described above are preferred embodiments of the present disclosure, and it should be noted that those skilled in the art can also make several improvements and modifications without departing from the principles of the present disclosure, which will also fall within the scope of protection of the present disclosure.

What is claimed is:

1. A method for contention-based random access, comprising:

sending, by a terminal side device, an Msg1 message corresponding to a two-step contention-based random access to a network side device;

receiving, by the terminal side device, an Msg2 message returned by the network side device, wherein if the terminal side device determines a failure of the two-step contention-based random access occurs according to a receiving condition of the Msg2 message, the terminal side device performs a handling procedure for the failure of the two-step contention-based random access;

wherein the Msg2 message is determined by the network side device according to a receiving condition that the network side device receives the Msg1 message;

in a case that neither the Random Access Preamble nor the data part of the Msg1 message corresponding to the two-step contention-based random access is successfully received, the terminal side device is incapable of receiving the Msg2 message within a receiving window of the Msg2 message or before a timer corresponding to the Msg2 message times out, and the terminal side device continues to attempt the two-step contention-based random access, in a case that a maximum number of total transmissions of the Random Access Preamble of the two-step contention-based random access configured by the network side device for the terminal side device is reached, a four-step contention-based random access is performed until the four-step contention-based random access succeeds, or in a case that a maximum number of total transmissions of the Random Access Preamble of the four-step contention-based random access configured by the network side device for the terminal side device is reached, the contention-based random access is determined to fail; or in a case that neither the Random Access Preamble nor the data part in the Msg1 message corresponding to the two-step contention-based random access is successfully received, the terminal device message is incapable of receiving the Msg2 message within a receiving window of the Msg2 message or before a timer corresponding to the Msg2 message times out, and the terminal side device directly switches to a four-step contention-based random access to make an attempt until one of following (1)-(2):

(1) the four-step contention-based random access succeeds; or (2) in a case that a maximum number of total transmissions of the Random Access Preamble configured by the network side device for the terminal side device is reached, then the contention-based random access is determined to fail;

wherein in case of each failure of the contention-based random access, the terminal side device backs off for a random period of time according to backoff parameters configured by the network side device and then attempts the two-step contention-based random access or the four-step contention-based random access again;

wherein identical backoff parameters are configured by the network side device for the two-step contention-based random access and the four-step contention-based random access, or different backoff parameters are configured by the network side device for the two-step contention-based random access and the four-step contention-based random access.

2. The method according to claim 1, wherein the Msg1 message at least carries a Random Access Preamble, and a data part.

3. The method according to claim 2, wherein the data part comprises at least one of a terminal identifier, a scheduling request (SR), a buffer status report (BSR), and real service data; and/or the Random Access Preamble and the data part are frequency division multiplexed (FDM), or time division multiplexed (TDM).

4. The method according to claim 1, wherein identical power ramping step parameters are configured by the network side device for the two-step contention-based random access and the four-step contention-based random access or different power ramping step parameters are configured by the network side device for the two-step contention-based random access and the four-step contention-based random access; or for the two-step contention-based random access, a power ramping step of the Random Access Preamble and a power ramping step of the data part of the Msg1 message corresponding to the two-step contention-based random access are different.

5. The method according to claim 1, wherein if a number of total transmissions of the Random Access Preamble of the two-step contention-based random access and/or the four-step contention-based random access of the terminal side device reaches a maximum number of total transmissions of the Random Access Preamble configured by the network side device for the terminal side device, a problem of the contention-based random access is reported to a higher layer, and the higher layer determines that a radio link of the terminal side device fails.

6. The method according to claim 1, further comprising:

receiving, by the terminal side device, configuration information of parameters about the two-step contention-based random access from the network side device.

7. The method according to claim 6, wherein the parameters about the two-step contention-based random access comprise at least one of:

a maximum number of transmissions of the Random Access Preamble, backoff parameters for re-attempt in case of failure of the random access, the power ramping step parameters in a process of the random access, and behaviors of the terminal side device after failure of receiving an entirety or a part of the Msg1 message.

8. The method according to claim 7, wherein the maximum number of transmissions of the Random Access Preamble comprises at least one of:

a maximum number of total transmissions of the Random Access Preamble of the two-step contention-based random access, a maximum number of total transmissions of the Random Access Preamble of the four-step contention-based random access, and a maximum number of total transmissions of the Random Access Preamble; and/or the behaviors of the terminal side device after the failure of receiving the entirety or a part of the Msg1 message comprises:

continuing to attempt the two-step contention-based random access by the terminal side device, or continuing to attempt the four-step contention-based random access by the terminal side device, or attempting the two-step contention-based random access for N times by the terminal side device and, if the attempting the two-step contention-based random access for N times failed, proceeding to attempt the four-step contention-based random access by the terminal side device, wherein N is the maximum number of total transmissions of the Random Access Preamble of the two-step contention-based random access.

9. A terminal side device, comprising:

a processor, a storage, and a computer program stored on the storage and executable by the processor, wherein when the processor executes the computer program, the processor implements steps of the method for contention-based random access according to claim 1.

10. A method for contention-based random access, comprising:
  receiving, by a network side device, an Msg1 message corresponding to two-step contention-based random access sent by a terminal side device;
  determining an Msg2 message according to a receiving condition of the Msg1 message by the network side device, and returning the Msg2 message to the terminal side device,
  wherein if the terminal side device determines a failure of the two-step contention-based random occurs according to the receiving condition of the Msg2 message, the terminal side device performs a handling procedure for the failure of the two-step contention-based random access;
  in a case that only the Random Access Preamble in the Msg1 message corresponding to the two-step contention-based random access is successfully received and the data part is not successfully received, the network side device returns, within a receiving window of the Msg2 message or before a timer corresponding to the Msg2 message times out, a Msg2 message corresponding to a four-step contention-based random access to the terminal side device; or
  in a case that neither the Random Access Preamble nor the data part of the Msg1 message corresponding to the two-step contention-based random access is successfully received, the network side device does not return the Msg2 message to the terminal side device;
  wherein identical backoff parameters are configured by the network side device for the two-step contention-based random access and the four-step contention-based random access, or different backoff parameters are configured by the network side device for the two-step contention-based random access and the four-step contention-based random access; and
  identical power ramping step parameters are configured by the network side device for the two-step contention-based random access and the four-step contention-based random access or different power ramping step parameters are configured by the network side device for the two-step contention-based random access and the four-step contention-based random access; or
  for the two-step contention-based random access, a power ramping step of the Random Access Preamble and a power ramping step of the data part of the Msg1 message corresponding to the two-step contention-based random access are different.

11. The method according to claim 10, wherein RAPID in the Msg2 message uses a predetermined value, or uses a predetermined domain identifier in a RAR MAC PDU sub-header or a MAC PDU.

12. The method according to claim 10, further comprising:
  sending, by the network side device, configuration information of parameters about the two-step contention-based random access to the terminal side device.

13. The method according to claim 12, wherein the parameters about the two-step contention-based random access comprise at least one of:
  a maximum number of transmissions of a Random Access Preamble, backoff parameters for re-attempt in case of failure of the random access, power ramping step parameters in a process of the random access, and behaviors of the terminal side device after failure of receiving an entirety or a part of the Msg1 message.

14. The method according to claim 13, wherein the maximum number of transmissions of the Random Access Preamble comprises at least one of:
  a maximum number of total transmissions of the Random Access Preamble of the two-step contention-based random access, a maximum number of total transmissions of the Random Access Preamble of a four-step contention-based random access, and a maximum number of total transmissions of the Random Access Preamble.

15. A network side device, comprising:
  a processor, a storage, and a computer program stored on the storage and executable by the processor, wherein when the processor executes the computer program, the processor implements steps of the method for contention-based random access according to claim 10.

* * * * *